United States Patent [19]

Meadows et al.

[11] Patent Number: 4,698,461

[45] Date of Patent: Oct. 6, 1987

[54] TOUCH PANEL WITH AUTOMATIC FREQUENCY CONTROL

[75] Inventors: Robert D. Meadows; Philip T. Krein, both of Portland; Bruce Murdock, Beaverton, all of Oreg.

[73] Assignee: Tektronix, Inc., Beaverton, Oreg.

[21] Appl. No.: 900,567

[22] Filed: Aug. 26, 1986

[51] Int. Cl.$^4$ .......................................... G08C 21/00
[52] U.S. Cl. ...................................................... 178/19
[58] Field of Search ................... 178/19, 18; 340/712, 340/706; 364/520, 578

[56] References Cited

U.S. PATENT DOCUMENTS 3,497,617  2/1970  Ellis ........................................ 178/19
4,293,734  10/1981  Pepper .................................. 178/19

Primary Examiner—Stafford D. Schreyer
Attorney, Agent, or Firm—John D. Winkelman; David P. Petersen

[57] ABSTRACT

A touch panel has panel scanning signals selectively applied to the four sides of a touch sensing surface of the panel so as to establish alternating current voltage gradients in desired directions across the touch sensing surface. When the panel is touched, touch signals result and are utilized by a touch location circuit in determining the location of touch. The impedance touch current resulting from a user's touch may also be determined and used. The touch panel circuit automatically adjusts the frequency of the applied panel signals to shift this frequency away from fixed frequency interference spectra, such as due to cathode-ray tube flyback signals, in the environment in which the touch panel is used. The touch location thereby minimizes the effects of such spectra on touch location determinations.

17 Claims, 16 Drawing Figures

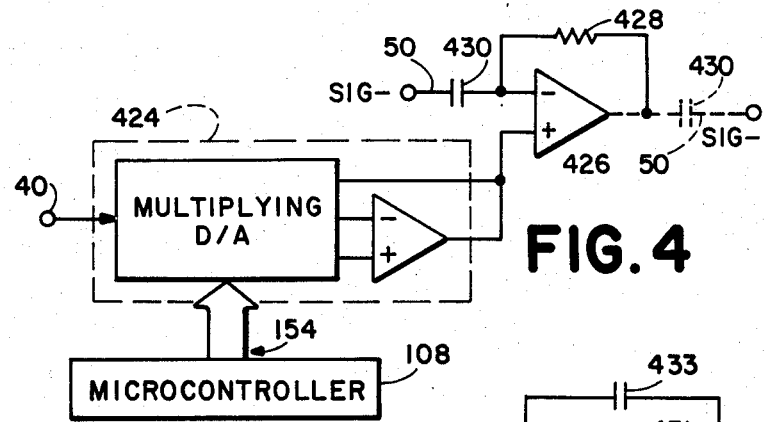
FIG. 4
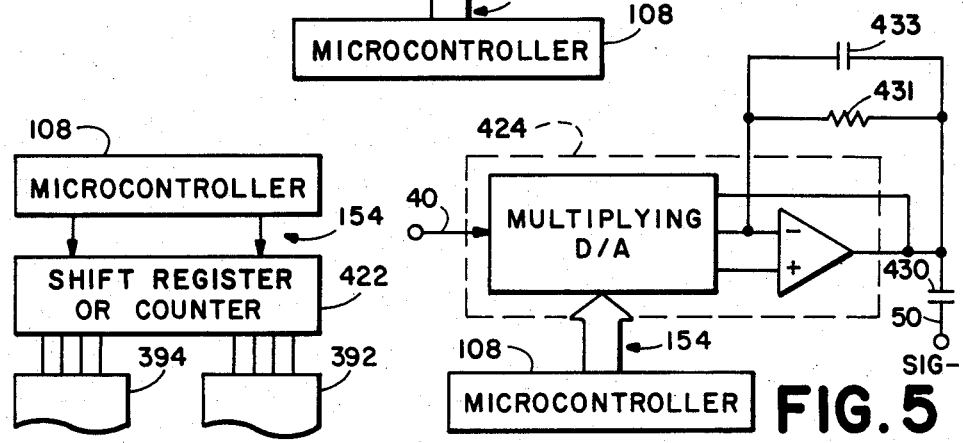
FIG. 6
FIG. 5
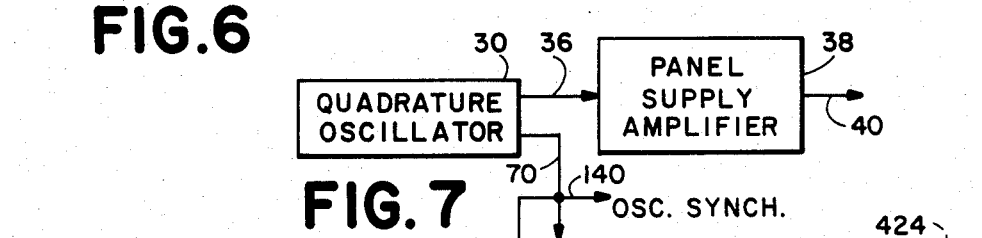
FIG. 7
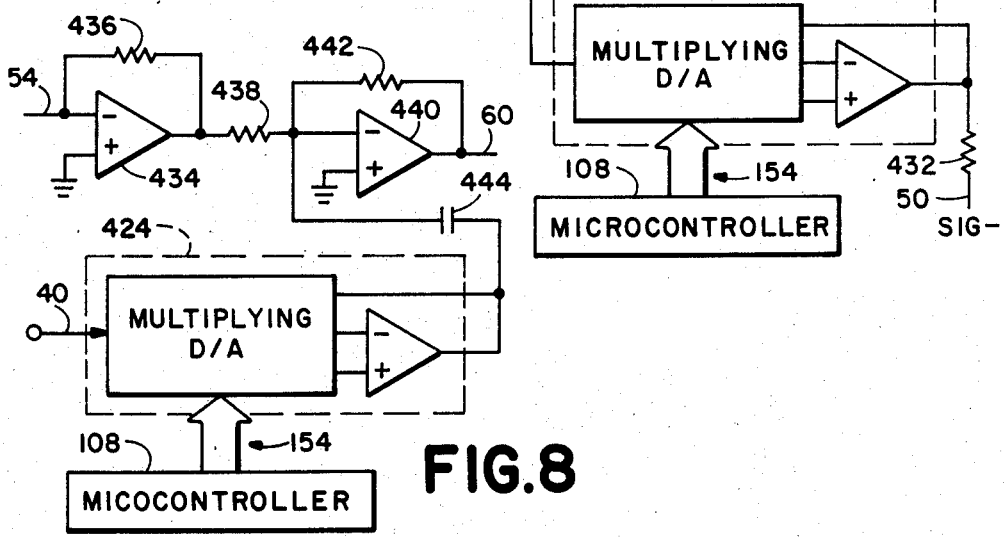
FIG. 8

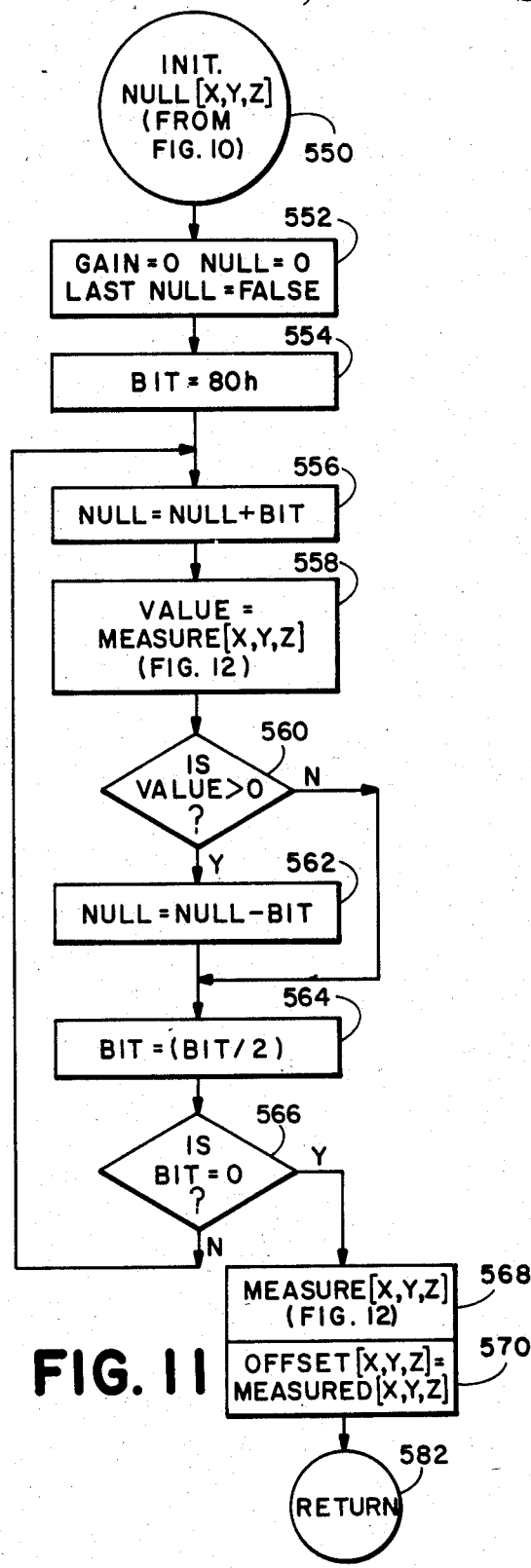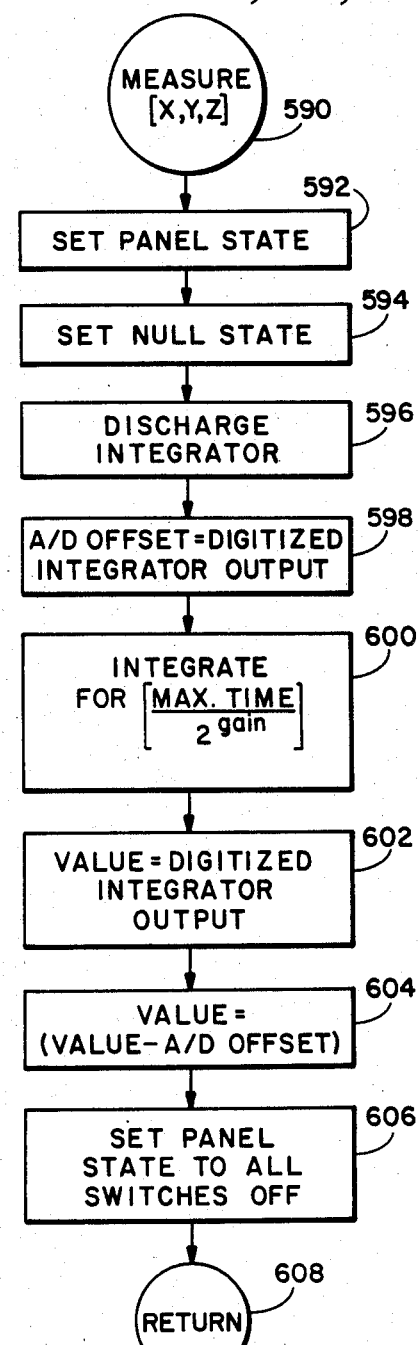
FIG. 11
FIG. 12

TOUCH PANEL WITH AUTOMATIC FREQUENCY CONTROL

TECHNICAL FIELD

This invention relates to a touch panel having a touch sensing surface and and also to a touch panel device having circuitry for determining the location, which may in essence be any location, at which the touch sensing surface of the device is touched. In addition, the invention relates to automatically shifting the frequency of panel scanning signals to enhance the accuracy of touch location determination.

The invention may be used with a wide variety of display devices of the type which display information from which a user makes a selection. One example is a lap held tablet in which a user selects and touches the device to, for example, indicate a response to a question. A further example is user selection of information items displayed on the screen of a display terminal, such as a cathode-ray tube (CRT) terminal, which is connected to a computerized information processing system.

Cathode-ray tube display terminals are known which employ a touch panel with a set pattern of touch sections over a terminal display screen. The terminal responds to touch at any section in the prescribed pattern and identifies the location of the touched section. Such a system typically employs a capacitive sensing technique. That is, a controller continually transmits a scanning signal across the touch panel and samples the sections until a touch is detected. When one of the sections is touched by a user, the capacitance of the user's body is added to the circuit. The controller senses the resulting change in capacitance and identifies the touched section from this change.

One example of such a touch responsive terminal is manufactured by RGB Dynamics of Salt Lake City, Utah. In the RGB device, a touch sensitive surface comprises indium tin oxide which is applied to a glass base plate. The coating is patterned in discrete sections with conductors coupling each section to an electrical detection circuit. Such patterning limits the touch resolution to the size of the patterned sections. Also, touch detection is limited by the particular pattern of sections employed. In addition, a complex wiring arrangement is required to make electrical contact with each of the patterned sections. Such complex connection schemes are more prone to failure and more costly than simpler arrangements.

Another known practice employs a pattern of transparent mechanical switches over a display. Sierracin-/Intrex Products of Sylmar, Calif. markets Transflex (TM) brand switches of this type. More specifically, this particular type of device employs membrane sheets which are pressed together at the touch of a user to make electrical contact. When the films are pressed together at a location, current flows in a specific circuit and identifies the location. Another membrane type touch panel of this type is disclosed in U.S. Pat. No. 4,484,038 of Dorman, et al.

Also, as described in a product bulletin, Dorman-Bodonoff Corp. of Andover, Mass. has a prior art Series 1000 touch screen device which utilizes an unpatterned membrane switch type touch panel. The Series 1000 touch panel devices have a controller which senses a switch closure on a transparent touch screen by switching current between X and Y axes of the touch screen. Current which has been passed through the various switches of the touch screen is converted to voltage and then from analog X/Y signals to digital X/Y position coordinates. In such a membrane switch type device, the membranes are subject to scratching. Also, the multiple layers used in these devices tend to have a high reflectance, a relatively low light transmission and a relatively low resolution.

It is known to detect and to locate the touch on a touch panel by providing an array of optical sources and detectors about the periphery of the touch panel. Alternatively, an array of ultrasonic generators and ultrasonic detectors are provided about the periphery of the panel. In each instance, the sources and detectors are connected with an electronic system that responds to and locates the disturbance which touch causes in the signals delivered from the sources to the detectors.

Another capacitive touch detection device is disclosed in U.S. Pat. No. 4,476,463 of Ng, et al. This particular device utilizes an electrically conductive touch sensitive coated surface with four elongated electrically conductive bar electrodes connected to the coating. One of these electrodes is provided along each side of the touch sensitive coating. As described in this patent, measurements are made of the change in electrical impedance which a capacitive touch introduces to a resistance-capacitance (R-C) circuit which includes the touch sensing surface. The impedance measurement examines the electrical time constant of the R-C circuit with the measurement being performed repeatedly from each end of each of two intersecting linear axes. The resultant measures are combined to determine the position of the touch. In one embodiment set forth in the Ng, et al. patent, an alternating current measuring signal is applied to an electrode and the voltage waveform generated in response to the applied signal is monitored at this electrode. The frequency of this measuring signal is varied until the monitored voltage waveform attains a selected condition. From the measuring signal frequency which yields the selected condition, a determination is made of the location of touch from the energized electrode. In another described embodiment, a direct current measuring signal having two successive selectively-timed values is applied to an electrode. The touch location relative to the energized electrode is determined from the voltage at the electrode resulting from the applied direct current signals. That is, the first measuring signal charges any capacitance coupled to the touch sensing coating, including the capacitance due to touch, to a known level. The second signal then partially discharges the capacitance through the resistance of the touch sensing coating. The voltage remaining on the electrode following this partial discharge identifies the location of touch from that electrode. The circuits described in the Ng, et al. patent have certain undesirable complexities, such as the need to apply signals of varying frequencies or direct current signals of two successively-timed values.

Still another touch panel device with a touch sensing surface is disclosed in U.S. Pat. No. 4,353,552 of Pepper, Jr. In the Pepper device, a user touches the touch sensing surface with a finger, or other body portion, or an electrically conductive stylus. Plural terminations (i.e. the four corners A, B, C and D) of the touch sensing surface are simultaneously driven to the same instantaneous potential by an oscillator. When the sensing surface is touched, currents flow through the driven terminations. The X and Y coordinates of touch are determined from these currents independently of the impedance of the user's touch. This approach suffers from inaccuracies in touch location determination and eliminates impedance information which can be useful in certain applications. In one embodiment, Pepper also utilizes pressure sensors, which, for example, sense pressure at a touched location in excess of a threshold. Upon such a determination, discrete action can be controlled, such as the firing of a gun during playing of a video game.

The accuracy of a number of these touch panel devices are adversely affected by noise in the environment in which they are used, and in particular by fixed frequency interference spectra, such as from cathode-ray tube flyback signals. Moreover, in some display devices, the fly-back signal frequency is varied as these display devices are operated. This makes it difficult to compensate for the effects of such signals.

Therefore, a need exists for an unpatterned touch panel which over overcomes these and other disadvantages of the prior art.

SUMMARY OF THE INVENTION

A touch panel device according to the present invention detects touch, such as a touch by a human finger, which occurs anywhere on a touch sensitive surface of a touch panel. Circuitry is provided for determining the position of the touch on the touch sensing surface. The position or location of the touch is typically determined relative to an X-Y coordinate system with the location of the touch being accurately pinpointed.

The touch locations are determined from touch signals or currents generated by selectively applying alternating current voltage panel scanning signals to the touch sensing surface.

In one scanning method, these panel scanning signals are applied so as to establish an alternating current voltage gradient in a first direction from a first side of the touch sensing surface to a second side of the touch sensing surface. When scanned in this manner and the touch sensing surface is touched by a user, a first touch current flows through the user and is detected. In addition, when a common alternating current voltage panel scanning signal is then simultaneously applied to both the first and second sides of the touching sensing surface, an impedance touch current flows through the user and is detected. The touch location along the first direction is determined from the detected first and impedance touch currents. Also, an alternating current voltage scanning panel signal may be applied to the touch sensing surface so as to establish an alternating current voltage gradient in a second direction across the touch sensing surface from third to fourth sides of the surface. When the panel is touched, a second touch current signal flows and is detected. Typically, the first and second directions are normal to one another and correspond to an X-Y coordinate system. The touch location is then determined relative to this coordinate system from the first, second and impedance touch currents. Other suitable scanning methods may also be used.

As a more specific feature of an illustrated embodiment of the present invention, a panel output signal processing circuit means is provided for processing the touch currents. A signal generator, having a frequency control input, provides panel scanning signals of a frequency which is variable and controllable in response to frequency control signals at the frequency control input. Also, the processing circuit means includes a processor circuit with means for automatically generating frequency control signals to shift the frequency of the signal generator means output away from fixed frequency interference spectra, such as due to cathode-ray-tube flyback signals, in the environment in which the touch panel is used.

In accordance with one aspect of the present invention, the touch panel device is nulled at times when the touch panel is untouched. If renulling of the touch panel is required more often than a preestablished rate, the frequency of the panel scanning signal is automatically shifted to a level which reduces the need for such renulling.

As a further optional aspect of the present invention, the processor circuit means determines the direction in which frequency shifts take place.

Touch locations can also be determined when touch is by an electrically conductive stylus in addition to a user's finger. Also, accurate touch location determination of touch by a gloved finger results when the glove is of an electrically conductive material, or, if not conductive, is sufficiently thin to allow measurable capacitive touch currents at the frequency of the panel scanning signals. Touching may also be by any other mechanism which permits such touch currents. When mentioned herein, touches by a gloved finger or by a stylus are to be understood as limited to touches by a glove or stylus of the type which allows such touch currents.

It is accordingly one object of the invention to provide an improved touch-responsive display device.

Still another object of the present invention is to provide improved circuitry and methods for locating the position at which a touch sensing surface of a touch panel is touched.

It is another object of the present invention to provide a touch panel device for locating touch on a touch sensing surface thereof with a relatively high degree of reliability and accuracy.

A further object of the present invention is to provide a touch panel device for locating touch on a touch sensing surface thereof whether touch is by a user's finger or other body part, by a user who is wearing a glove, or by a stylus.

Another object of the present invention is to minimize the effects of fixed frequency interference spectra, such as, cathode-ray tube horizontal flyback signals, on touch panel device operation.

These and other objects, features and advantages of the present invention will become apparent with reference to the following description and drawings.

BRIEF DESCRIPTION OF THE DRAWINGS

FIG. 4 is a block circuit diagram of an alternate form of automatic nulling circuit utilized in the touch panel device of FIG. 1;

FIG. 5 is a block circuit diagram of a further form of automatic nulling circuit;

FIG. 6 is a block circuit diagram of a still further form of automatic nulling circuit;

FIG. 7 is a block circuit diagram of another form of automati nulling circuit;

FIG. 8 is a block circuit diagram of still another form of automatic nulling circuit;

FIG. 11 is a flow chart of an initial nulling sequence utilized by the microcontroller of FIG. 1 during the initial panel scanning frequency determination of FIG. 9;

FIG. 12 is a flow chart of the touch signal or current measuring sequence utilized by the microcontroller of FIG. 1;

FIG. 16 is a flow chart of a sequence utilized by the microcontroller of FIG. 1 for changing the frequency of the panel scanning signals during operation of the touch panel device.

DETAILED DESCRIPTION OF PREFERRED EMBODIMENTS

Overall Description

Figure 1:
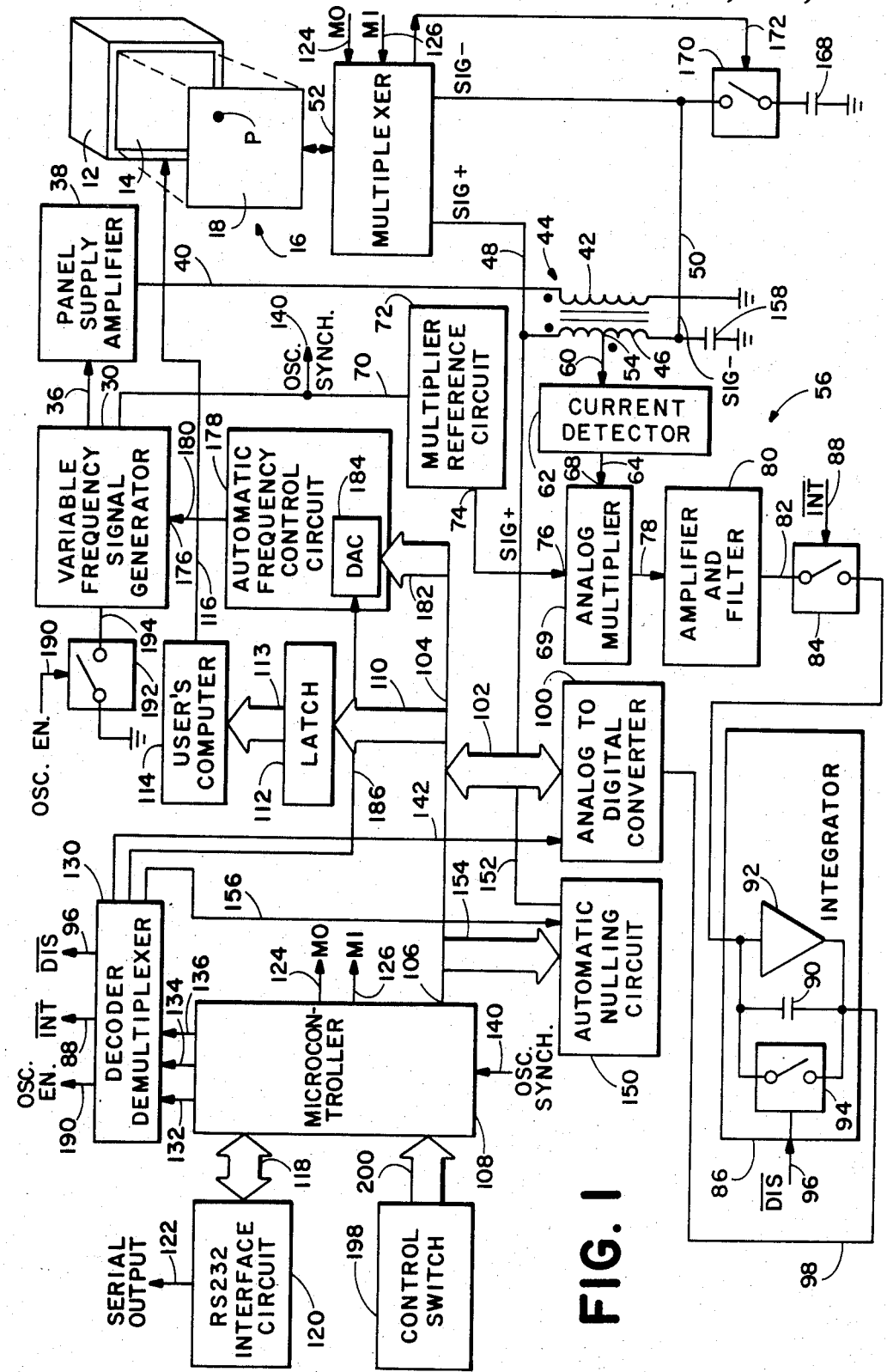
FIG. 1 is a block diagram of one embodiment of a touch panel device according to the present invention.

As shown in FIG. 1, a touch panel device in accordance with the invention has a display unit 12 with a display screen 14. The illustrated display unit comprises a cathode-ray tube computer terminal and, accordingly, the display screen 14 comprises the face of the cathode-ray tube. An optically-transparent touch panel 16 is positioned to overlay the screen 14 so that the screen is visible through the touch panel. By optically transparent, it is meant that it is possible to perceive images on screen 14 through the touch panel 16. In other applications, the display unit 12 is eliminated. For example, an information containing sheet of paper, such as a question and answer sheet, may be positioned underneath the touch panel 16 with the touch panel being utilized to enter data relating to the question and answer sheet. In certain applications, the touch panel 16 need not be transparent. For example, the touch panel may simply be used as a data entry pad with the location touched causing the entry of data into a computer or other device.

The touch panel 16 has a base plate, which may be of glass or other optically transmissive material, with an electrically-conductive coating 18 over its outer surface. The coating 18 may cover the entire display screen 14 when the touch panel is in place, or only that portion of the screen 14 which is used to display user-selectible items.

As shown in general in FIG. 2, and described in greater detail below, the coating 18 comprises a touch sensitive or sensing surface with plural electrical contacts or electrodes, in this case twenty such contacts A through T. A first set 22 of these contacts, that is contacts P through T, is positioned in a row at one side of the touch sensing surface 18. A second set 24 of contacts, contacts F through J, is positioned in a row at the opposite side of the touch sensing surface from the first set. That is, the first and second sets 22, 24 are in rows spaced apart from one another in a first direction across the surface 18. A third set 28 of such contacts, contacts K through O, is positioned along the lower or third side of the surface 18. In addition, a fourth set of such contacts, contacts A through E, is positioned along the fourth or upper side of the surface. Thus, the third and fourth sets of contacts are spaced apart from one another in a second direction across the touch panel surface. The contacts may comprise air dried silver contact paint spots, approximately 0.2 inches square. Respective leads are coupled to the contacts to facilitate convenient electrical connection to the contacts. To provide strain relief, the portion of each of these leads adjacent to its associated contact may be secured, as by epoxy, to the edge of the touch panel base plate.

With this construction, the first and second sets 22, 24 of contacts are at the opposite horizontally separated peripheral side edges of the touch panel. The other sets 26, 28 of contacts are vertically spaced apart at opposite peripheral side edges of the touch panel. Although the contacts of each set do not necessarily have to be in a line, when colinear and when the first and second directions are normal to one another, the contacts define a reference coordinate system. Touch locations are determined relative to this coordinate system by the circuitry explained below. Moreover, when the touch panel is mounted and calibrated, the contacts are at known locations relative to the terminal screen 14. Therefore, by determining a touched location on the touch sensing surface 18, a corresponding determination is made of the location on the display terminal screen 14. It should be noted that the invention is not limited to this particular contacting scheme. Moreover, a greater or fewer number of contacts may be used along each side of the touch sensing surface.

Figure 2:
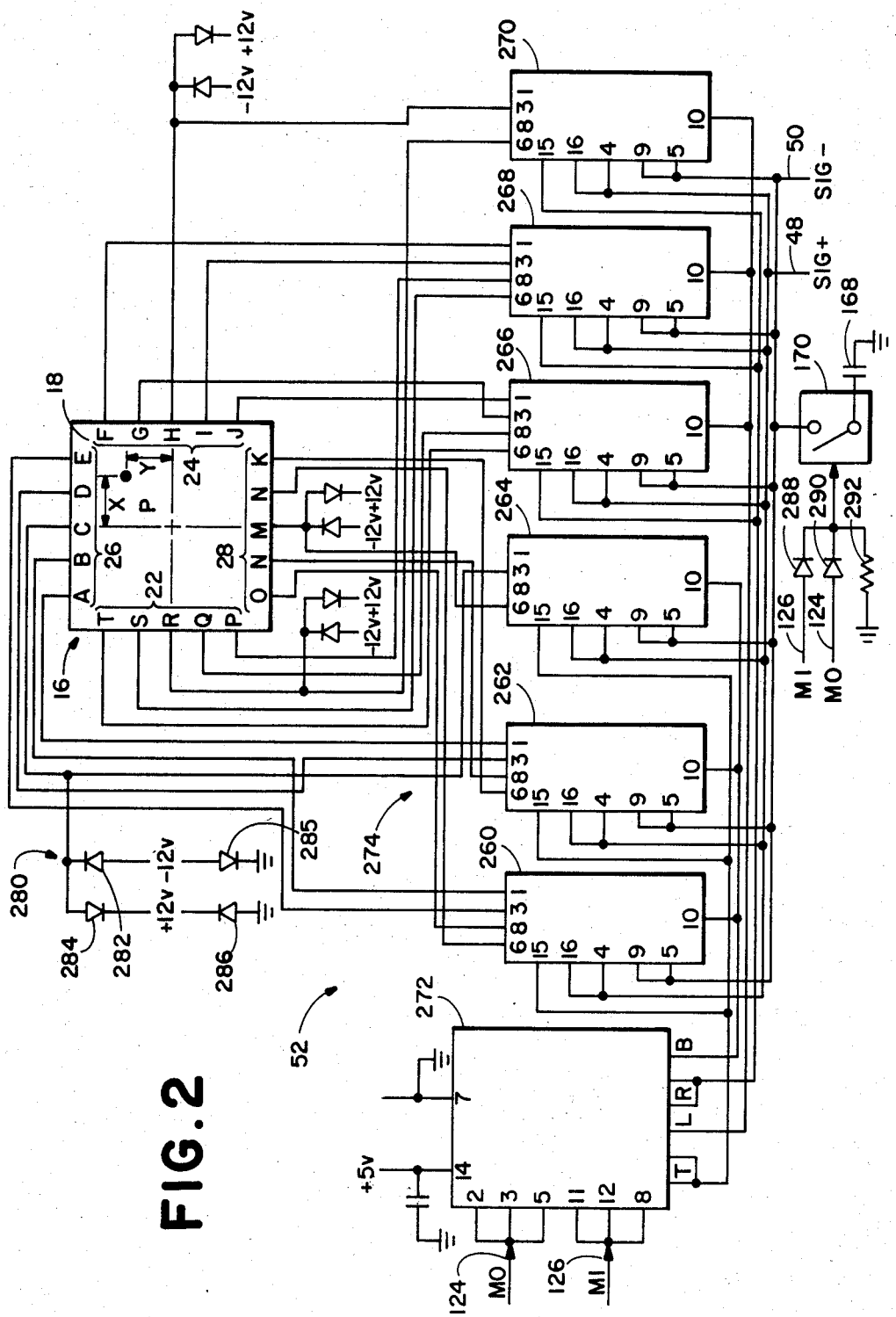
FIG. 2 is a front elevational view of a touch panel in accordance with the present invention and also showing one form of switching circuitry for applying panel scanning signals a touch sensing surface of the panel.

The touch locating system illustrated in FIG. 2 utilizes the two pairs of opposed sets 22, 24 and 26, 28 in determining the touch location relative to the two directions across the touch sensing surface. Only one pair of opposed sets is used if single direction touch location determination is to be made. That is, sets 22 and 24 are used to determine touch location in the first or X direction. Also, sets 26 and 28 are used to determine touch location in the second or Y direction.

With further reference to FIGS. 1 and 2, a function generator or signal source 30 generates an alternating current voltage touch panel scanning signal at an output 36. A panel driving amplifier 38 receives the panel scanning signal, amplifies this signal, and applies the resultant signal on an output 40 to the primary winding 42 of a touch panel driving transformer 44. This drives the secondary winding 46 of the transformer and establishes an alternating current voltage across the secondary winding between its signal plus (SIG+) output 48 and its signal minus (SIG−) output 50. A multiplexer or switching circuit 52 applies the panel scanning signals from outputs 48 and 50 of the secondary winding to selected sets or rows of the touch panel contacts as explained below. In response to these scanning signals, panel output touch signals or touch current signals are generated at the center tap 54 of the transformer 44 when the touch sensing surface is touched. These touch current signals are processed by a panel output signal processing circuit means 56 to provide an indication of the location of touch and other information.

In the illustrated panel output signal processing circuit 56, the touch current signals from center tap 54 are transmitted along a line 60 to a touch current detector 62, such as a current sensing operational amplifier. The output of amplifier 62 corresponds to the touch currents at the center tap 54. The amplifier 62 output is fed on an output line 64 through a filter 66 (FIG. 3) and then to one input 68 of an analog multiplier 69. The signal generator 30 has an alternating-current voltage reference output which is coupled by a line 70 to a multiplier reference circuit 72. Multiplier reference voltage signals from the reference circuit are applied on a line 74 to a reference input 76 of the analog multiplier. The reference output signals synchronize the multiplication by multiplier 69 with the alternating current voltage signals applied to the touch sensing surface 18.

The resulting multiplied touch current signals are transmitted along a line 78 to an amplifier and filter circuit 80. The output of circuit 80 is fed on a line 82 through an integrator timing switch 84 and to an integrator circuit 86, which integrates these signals. The integrator timing switch 84 is closed during integration time periods in response to integration timing ($\overline{INT}$) signals generated as explained below and applied to an integrator timing input 88. When switch 84 closes, signals delivered to integrator circuit 86 are integrated therein. The integrator circuit includes an integrating capacitor 90 in parallel with an amplifier 92. In addition, an integrating capacitor discharge switch 94 is included for selectively discharging integrating capacitor 90 in response to discharge ($\overline{DIS}$) signals on a line 96. These discharge or integrator zero signals are generated as explained below. The integrated touch current signals are fed on a line 98 to an analog to digital converter circuit 100 which digitizes these signals. These digitized signals are transferred along data busses 102, 104 to data inputs 106 of a microcontroller 108. The microcontroller, among other functions, computes the touch location and other desired information from the touch current signals.

The microcontroller 108 interacts via bus 104, a bus 110, a parallel output latch 112, and a bus 113 with a computer 114. Computer 114 is connected by a line 116 to the display terminal 12. For an example of such interaction, computer 114 may cause selected information to be displayed on the screen 14. Also, computer 114 may change the displayed information, as determined by software, depending upon the touched location. This is accomplished in a conventional manner to fit the desired application. The microcontroller 108 is also coupled by a bus 118 to a conventional RS232 telecommunications interface circuit 120. This permits the touch panel to communicate over a telecommunications network with remote data processing stations. Typically, a serial output 122 is provided from the interface circuit 120.

Control signals from the microcontroller 108 are transmitted at respective M0 and M1 outputs along lines 124, 126 to the multiplexer 52. These control signals cause the multiplexer to route the panel scanning signals to desired sets of contacts. Therefore, touch current signals are generated from which touch locations may be determined. Exemplary scanning sequences are discussed below.

The FIG. 1 panel output signal processing circuit 56 also includes a decoder demultiplexer circuit 130. Decoder 130 decodes input signals on lines 132, 134, and 136 from the microcontroller and, in response thereto, generates signals which control various functions of the touch panel circuitry. For example, decoder 130 generates the integration timing signals ($\overline{INT}$) fed to line 88. Upon receiving these signals, switch 84 closes so that integration commences when touch location determinations are desired. Integration continues for the duration of the $\overline{INT}$ signal. The decoder circuit also generates the integration capacitor discharge signals ($\overline{DIS}$) on line 96. These signals cause switch 94 to close so that integration capacitor 90 is discharged prior to each successive integration. The microcontroller has a synchronization input which receives synchronization signals on a line 140 derived from the reference output of signal source 30. Consequently, integration is synchronized with the application of panel scanning signals to the touch sensing surface 18. The decoder circuit also has an output coupled by a line 142 to the analog to digital converter 100 for controlling the delivery of digitized integrated touch signals from converter 100 to the microcontroller 108.

More accurate determination of touch currents and touch locations result when the analog to digital converter is providing an output of a magnitude which is within a desired range. If too small, minor variations in touch currents can be overlooked and spurious signals have a greater impact. If too large, the analog to digital converter may overflow and provide an inaccurate touch current indication. To minimize such possibilities, microcontroller 108 monitors the magnitude of the analog to digital converter output. When outside a desired range, microprocessor 108 adjusts the duration of an integration timing control signal sent to decoder 130. In response, the decoder adjusts the duration of the $\overline{INT}$ signal, and thus the integration time period, to bring the analog to digital converter output to the desired level. This facilitates the use of the touch panel device under widely varying conditions with accompanying widely varying touch currents. For example, in situations in which a stylus is used to touch the touch sensing surface 18, an individual touches the touch sensing surface with a bare finger or other body part, or even if the individual touches the touch sensing surface with a gloved finger.

A nulling circuit 150 is utilized to adjust touch current signals at the center tap 54 to a null or zero value at times when the touch sensing surface 18 is not being touched. After nulling, the existence of currents at center tap 54, at least currents above a noise threshold level, indicate the presence of a touch. In general, nulling circuit 150 automatically provides a suitable offset current at center tap 54 to counteract or nullify any current signal at the center tap under no touch conditions.

The FIG. 1 form of automatic nulling circuit accomplishes this by selectively coupling an effective capacitive load to one of the panel scanning outputs, in this case, via a line 152 to the SIG+output 48. The nulling circuit 150 responds to nulling signals from microcontroller 108 which are delivered on bus 104 and a bus 154 to an input of the automatic nulling circuit. The magnitude of the effective capacitive load coupled to the SIG+output 48 by the nulling circuit is varied in response to the nulling signals to thereby effect nulling. Typically, an offset nulling capacitor 158 is coupled to the SIG− panel scanning output 50 to provide initial offset to the center tap touch current signals in a direction opposite to the offset provided by the automatic nulling circuit. Consequently, as capacitance is added by the automatic nulling circuit to the SIG+ panel scanning output, the initial offset provided by capacitor 158, and from other ambient signals are balanced. Another offset capacitor 168 is selectively coupled by a switch 170 to the SIG— panel scanning output 50. Switch 170 is closed in response to a signal on a line 172 from multiplexer 52 during impedance touch current determinations. When both of the capacitors 158 and 168 are coupled to the circuit, the initial offset is higher because higher current leakage typically occurs during impedance touch current determinations.

The touch panel circuit 56 of FIG. 1 also includes an automatic frequency control means for shifting the frequency of the panel scanning signals to levels which are unaffected by fixed frequency interference spectra, such as cathode-ray tube horizontal flyback signals, in the environment in which the touch panel device is used. In this description, the phrase "fixed frequency interference spectra" refers to periodic signals and their harmonics of the type typically generated by equipment used with the touch panel device. This term encompasses signals which are fixed for a time and then changed to another fixed value, such as the variable and multiple horizontal flyback signals in some cathode-ray tube displays. It also includes ambient noise signals which vary at a rate which is slower than the rate at which the touch panel device is capable of adjusting the panel excitation frequency. Operation of a touch panel device at or near such fixed frequency interference spectra severely degrades touch location determination and, in some cases, makes such determination totally unreliable.

In the FIG. 1 form of the invention, the signal generator 30 comprises a variable frequency signal generator. This signal generator has a frequency control input 176. Signal generator 30 comprises means for producing alternating current voltage outputs on lines 36, 70 of a frequency which is variable and controllable in response to frequency control signals at the frequency control input 176. Under the control of microcontroller 108, an automatic frequency control circuit 178 generates the frequency control signals and delivers such signals on a line 180 to the frequency control input 176. More specifically, at times microcontroller 108 determines that frequency adjustment is needed, digital frequency control signals are delivered on bus 104 and a bus 182 to the automatic frequency control circuit 178. A digital to analog converter 184 responds to signals from line 186 of decoder 130 to transfer the frequency control signals from bus 182 to the automatic frequency control circuit. Typically, a frequency adjustment is made when nulling adjustments become too frequent, the object being to shift the operating frequency to a level which reduces the rate of nulling adjustments. The microcontroller also predetermines the direction, upwardly or downwardly, of the frequency changes.

The touch panel device of FIG. 1 also includes features for protecting the circuit 56, as well as the touch sensing surface 18, from excessive touch currents. Specifically, assume microcontroller 108 determines that the touch currents are in excess of a maximum safe threshold and that the integrator 86 is integrating for its minimum integration time period. In this case, the microcontroller causes decoder 130 to shut off an OSC. EN. output on a line 190. This causes a switch 192 to close and grounds a signal generator disable input 194 of source 30. When this happens, the signal generator output terminates so that panel scanning signals to the touch sensing surface 18 are interrupted. For added protection, the M0 and M1 outputs from microcontroller 108 are shifted to digital logic levels which control multiplexer 52 to open the connections between the SIG+ and SIG— panel scanning outputs and the touch sensing surface.

A manually operated control switch 198 is coupled to the microcontroller 108 by control lines 200. As explained more fully below, the settings of switch 198 designate processing parameters, such as whether touch location signals are to be delivered at the parallel output 113 or the serial output 122.

Panel Scanning Sequences and Touch Location Determination

As explained in greater detail below, microcontroller 108 controls the multiplexer 52 so as to repetitively apply the transformer SIG+ and the SIG— outputs 48, 50 to selected sides of the touch sensing surface 18 in a predetermined sequence. From the resulting touch currents, the touch location and other information is determined.

As a first specific example of a scanning sequence, and with reference to FIG. 2, assume that the touch currents have been adjusted to zero by nulling circuit 150 when the touch sensing surface is untouched. Also, assume that an X-Y coordinate system has been established with its origin at the center of the touch sensing surface. If a point P is touched, the location of this point is given by the coordinates X and Y as shown in FIG. 2 (also sometimes indicated herein as $X_p$, $Y_p$).

In a first mode of this first scanning sequence, the SIG— output 50 is coupled to the set of contacts 22 and the SIG+ output 48 is coupled to the set of contacts 24. In addition, the other sets of contacts 26 and 28 are open circuited (although they need not be). In this mode, an alternating current gradient is established in a first or X direction across the touch sensing surface. In this case, the first direction is horizontal and comprises an X axis. As explained below, after multiplication by multiplier 69 and filtering, the resulting first or X touch current is expressed by the following equation:

$$i_x = K_x \, X \, V/Z_t$$

In the above equation, $i_x$ is the resulting touch current, which may be designated as a first or X touch current. Also, V is the voltage at secondary winding output 48 relative to virtual ground at the center tap of the transformer. In addition, $Z_t$ is the impedance added to the circuit when a user touches the touch sensing circuit and $K_x$ is a constant. In addition, the quantity $V/Z_t$ corresponds to the impedance current that flows upon touch by a user. Finally, X is the X location of touch.

In a second mode of this first scanning sequence, the SIG+ output 48 is coupled to at least one, and typically simultaneously to both, of the first and second sides 22, 24 of the touch sensing surface. This establishes a uniform alternating current voltage in the first direction. In this mode, any touch current at the center tap 54 corresponds to the impedance touch current through a user. This impedance touch current $i_z$, after multiplication and filtering, may be expressed as follows:

$$\text{(b) } i_z = \frac{V}{Z_t} K_z$$

In other approaches to the impedance current scanning mode, one of the panel scanning outputs (i.e., the SIG+ output) is coupled to one side only of the touch sensing surface, to two adjacent sides, or to all four sides.

The above two equations may be combined to provide the following equation for the X location of touch:

$$\text{(c) } X = \frac{i_x K_z}{i_z K_x}$$

To determine the quantity $K_z/K_x$, one touches the touch sensing surface at known X locations. For example, at the four corners or at the far right and far left along the X-axis. By substituting the known X locations in formula (c) above and averaging the results, a value of $K_z/K_x$ can be determined. Once $K_z/K_x$ is determined, unknown X touch locations can be computed from the first and impedance touch current signals using the above equations.

Assuming two dimensional touch information is desired, the first scanning sequence includes a third mode. In the third mode, the SIG+ output 48 is coupled to top side 26 of the touch sensing surface and the SIG− output 50 is coupled to the bottom side 28 of the touch sensing surface. This establishes an alternating current voltage gradient in the second or Y direction across the touch sensing surface. The resulting second or Y touch current, $i_y$, after multiplication and filtering, is expressed by the following equation:

$$\text{(d) } i_y = K_y Y \frac{V}{Z_t}$$

In the above equation, Y is the Y location of touch. In addition, $K_y$ is a constant which may be determined in the same manner as $K_x$. In the FIG. 1 form of the invention, $K_y$, $K_x$ and $K_z$ are each approximately equal to one. Therefore, there is no need to determine these constants. Combining formulas (b) and (d) above results in the following expression of Y location:

$$\text{(e) } Y = \frac{i_y K_z}{i_z K_y}$$

In this expression, $K_z/K_y$ is a constant which may be determined in the same manner as $K_z/K_x$.

Thus, in the above manner the X and Y coordinates of touched location P can be determined from touch currents generated by scanning the touch sensing surface in the three modes described above. By repeating the scanning cycle a predetermined number of times and combining or averaging the results, an accurate determination of touch position can be obtained. However, although less accurate, touch location can be determined with sufficient precision in many applications without averaging. The switching of the scanning signals between the various modes is accomplished by multiplexer 52 under the control of M0 and M1 signals from the microcontroller 108. The location of touch on the touch panel 16 identifies, to the computer 114, which informational item being displayed on the terminal 12 has been selected by the user. The terminal 12 then responds in a known manner to this determination of user selection.

In addition to determining touch location, additional information may be obtained from the generated touch currents. For example, the X and Y coordinates may be computed at successive times with the impedance touch current $i_z$ also being monitored. If X and Y do not vary, but $i_z$ varies, this indicates that the user is continuing to touch a particular location on the touch sensing surface, but has changed the manner of touching this location. For example, the user may be pressing his or her finger harder at the touched location. This varies the area of the touch sensing surface which is touched. The resulting variation in impedance touch current can be used by computer 114 for control of additional functions. For example, if the touch screen is pressed at the same location, but only harder, the resulting change in impedance touch current $i_z$ is detected and can be used to call up a particular subroutine which operates on data identified by the touched location.

Another scanning sequence which provides desired X and Y touch currents, as well as impedance touch currents, is as follows. This second sequence involves scanning the touch sensing surface in four modes instead of the three modes previously described. With reference to FIG. 2, this scanning method is described with reference to a touch point P identified by $X_1$, $X_2$, $Y_1$ and $Y_2$ locations. That is, the total distance in the X direction across the touch sensing surface is known and is equal to the sum of $X_1$ and $X_2$. Also, $X_1$ is defined as the horizontal distance from the left side of the panel in FIG. 2 to point P while $X_2$ is the horizontal distance from the right side of the panel to point P. Moreover, the total distance in the Y direction across the panel is known and equal to the sum of $Y_1$ and $Y_2$. Also, $Y_1$ is the distance from the lower side of the touch sensing surface to point P while $Y_2$ is the distance from the upper side of the touch sensing surface to point P.

In the first mode of this second scanning sequence, the multiplexer 52 is configured to couple the SIG+ output 48 to the right side of the touch sensing surface while the center tap 54 is coupled to the left side of the touch sensing surface. This establishes an alternating current voltage gradient across the touch sensing surface in the X direction from right to left. Assume that the nulling circuit has been adjusted to null the touch currents to zero when the touch sensing surface is untouched. Also assume that multiplication and filtering has been performed. Under these conditions, a first touch current $i_{x1}$ at the center tap is expressed as follows:

$$\text{(f) } i_{x1} = K_x \frac{X_1}{X_1 + X_2} \frac{V}{Z_t}$$

In addition, when in a second mode, the SIG+ output 48 is applied to the left side of the touch sensing surface and the center tap 54 is coupled to the right side of the touch sensing surface. This also establishes an alternating current voltage gradient in the X direction, but from left to right. In this case, and with the above assumptions, a second touch current $i_{x2}$ is expressed by the following formula:

$$\text{(g) } i_{x2} = K_x \frac{X_2}{X_1 + X_2} \frac{V}{Z_t}$$

When formulas (f) and (g) are added, the impedance touch current $i_{zx}$ is given as follows:

$$\text{(h)} \quad K_x \frac{V}{Z_t} = (i_{x1} + i_{x2}) = i_{zx}$$

Finally, combining formulas (f) and (h) results in the following expression for $X_1$, the X-axis position of touch point P:

$$\text{(i)} \quad X_1 = \frac{i_{x1}(X_1 + X_2)}{(i_{x1} + i_{x2})}$$

In the above equations, $K_x$ is a constant and can be determined in the same manner as explained above by touching the touch sensing surface at known locations. In addition, as previously mentioned, the sum $X_1$ plus $X_2$ is known. Therefore, from the above two measurements, X-axis position information for touch point P can be calculated. Also, information is obtained concerning changes in the impedance touch current $i_{zx}$.

The Y-axis position information is determined in the following manner. In the third mode of this second scanning sequence, the SIG+ output 48 is coupled to the top side of the touch sensing surface while the center tap 54 is coupled to the bottom side of the touch sensing surface. The resulting third touch current $i_{y1}$ is expressed as follows:

$$\text{(j)} \quad i_{y1} = K_y \frac{Y_1}{Y_2 + Y_1} \frac{V}{Z_t}$$

In the fourth mode, the SIG+ output 48 is coupled to the bottom side of the touch sensing surface while the center tap is coupled to the top side of the touch sensing surface. This results in a fourth touch current $i_{y2}$ expressed by the following equation:

$$\text{(k)} \quad i_{y2} = K_y \frac{Y_2}{Y_2 + Y_1} \frac{V}{Z_t}$$

By combining formulas (j) and (k), the following expression for impedance touch current $i_{zy}$ is obtained:

$$\text{(l)} \quad K_y \frac{V}{Z_t} = (i_{y1} + i_{y2}) = i_{zy}$$

Furthermore, when formulas (j) and (1) are combined, an equation for $Y_1$ is obtained:

$$\text{(m)} \quad Y_1 = \frac{i_{y1}(Y_1 + Y_2)}{(i_{y1} + i_{y2})}$$

As explained above, the sum $Y_1$ plus $Y_2$ is known. In addition, the constant $K_y$ can be determined in the same manner as the constant $K_x$. Thus, the $X_1$ and $Y_1$ positions can be obtained from the touch currents. In addition, changes in the impedance touch current can be monitored as desired.

As will be apparent to those skilled in the art, other scanning sequences and modes of establishing alternating current gradients across the touch sensing surface may be employed to generate the touch signals or currents from which the desired location information can be determined.

Touch Panel Structure

Again referring to FIG. 2, the touch panel 16 has a touch sensitive surface 18 which extends across the area thereof which, in conjunction with a location determination circuit, is used to sense touch by a user. As previously mentioned, the touch panel 16 includes a base plate coated on a surface 18 with an electrically conductive film. One suitable example of such a film is indium tin oxide (10% indium, 90% tin oxide) having a sheet resistivity of 200 ohms per square and a transmission of 85% for light at 520 nanometers. Such plates are commercially available, such as from Optical Coating Laboratory (OCLI) of Santa Rosa, Calif. The sheet resistivity of the film is not highly critical, with resistivities of 50 to 2,000 ohms per square, or higher, being suitable. Sheet resistivities significantly below 200 ohms per square may require special low resistance switches and can result in relatively high power consumption.

The base plate is not limited to any particular shape. Thus, it may be circular, concave, spherical, curved or flat to fit the screen 14. In addition, the base plate may be opaque or optically transparent and of a variety of suitable materials. To reduce glare from reflected light from background sources, the base plate may be of a commercially available anti-glare glass. This glass may also be flat or contoured to match the curvature of the display screen. One source of such base plates is Eagle Convex Glass Co. of Charlesburg, W. Va.

As previously mentioned, the particular contacting scheme employed may be varied as exemplified by the approaches mentioned above. Of course, the specific multiplexer or switching circuit 52 will vary depending upon the contacting arrangement which is chosen. In general, any contacting arrangement may be employed which facilitates the establishment of a relatively uniform alternating current voltage gradient across the touch sensing surface in the desired directions.

Touch Panel Excitation Circuit

Figure 3A:
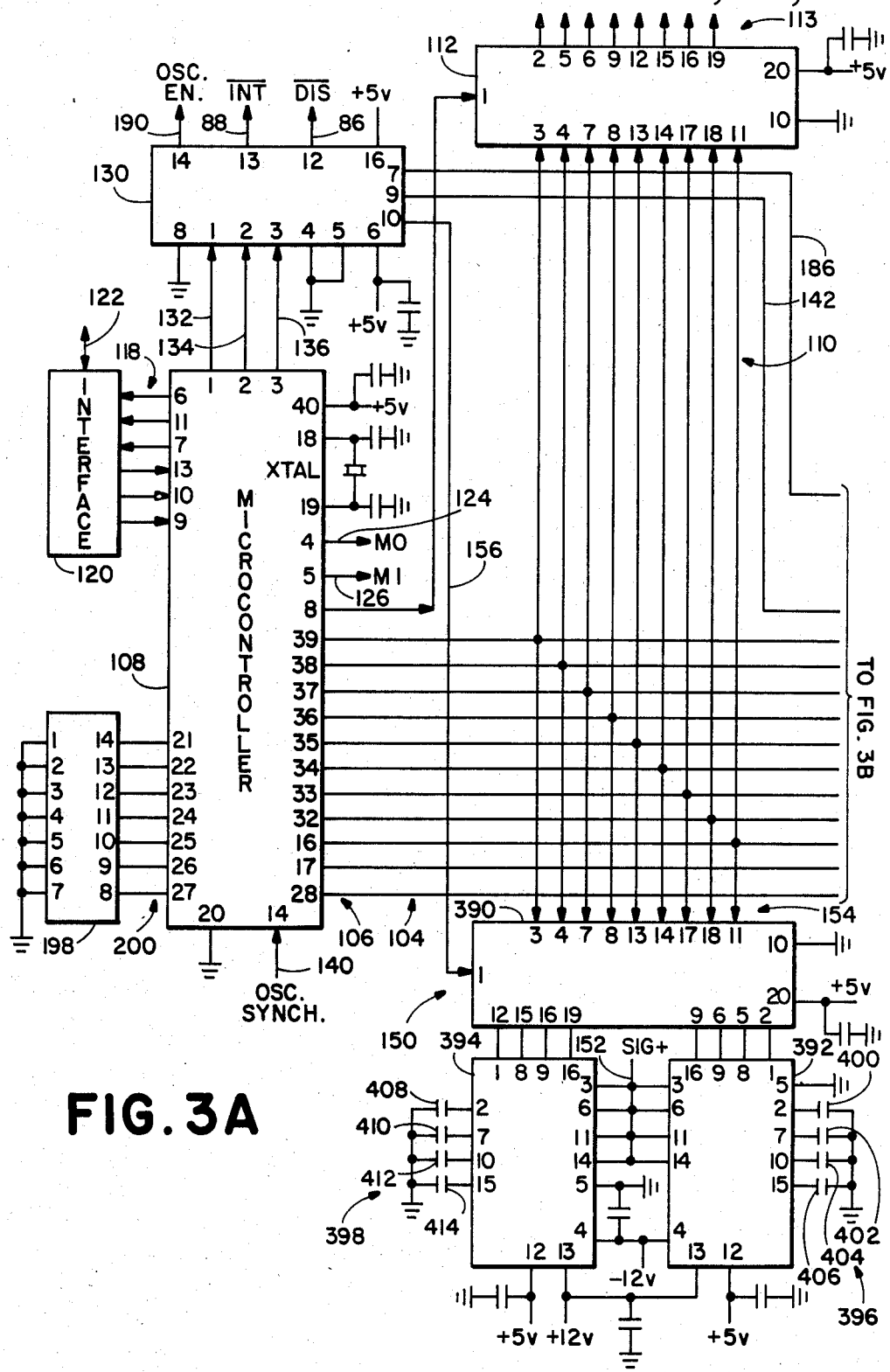
FIG. 3 is an electrical circuit schematic diagram of a portion of the touch locating circuit utilized in the embodiment of FIG. 1.
Figure 3B:
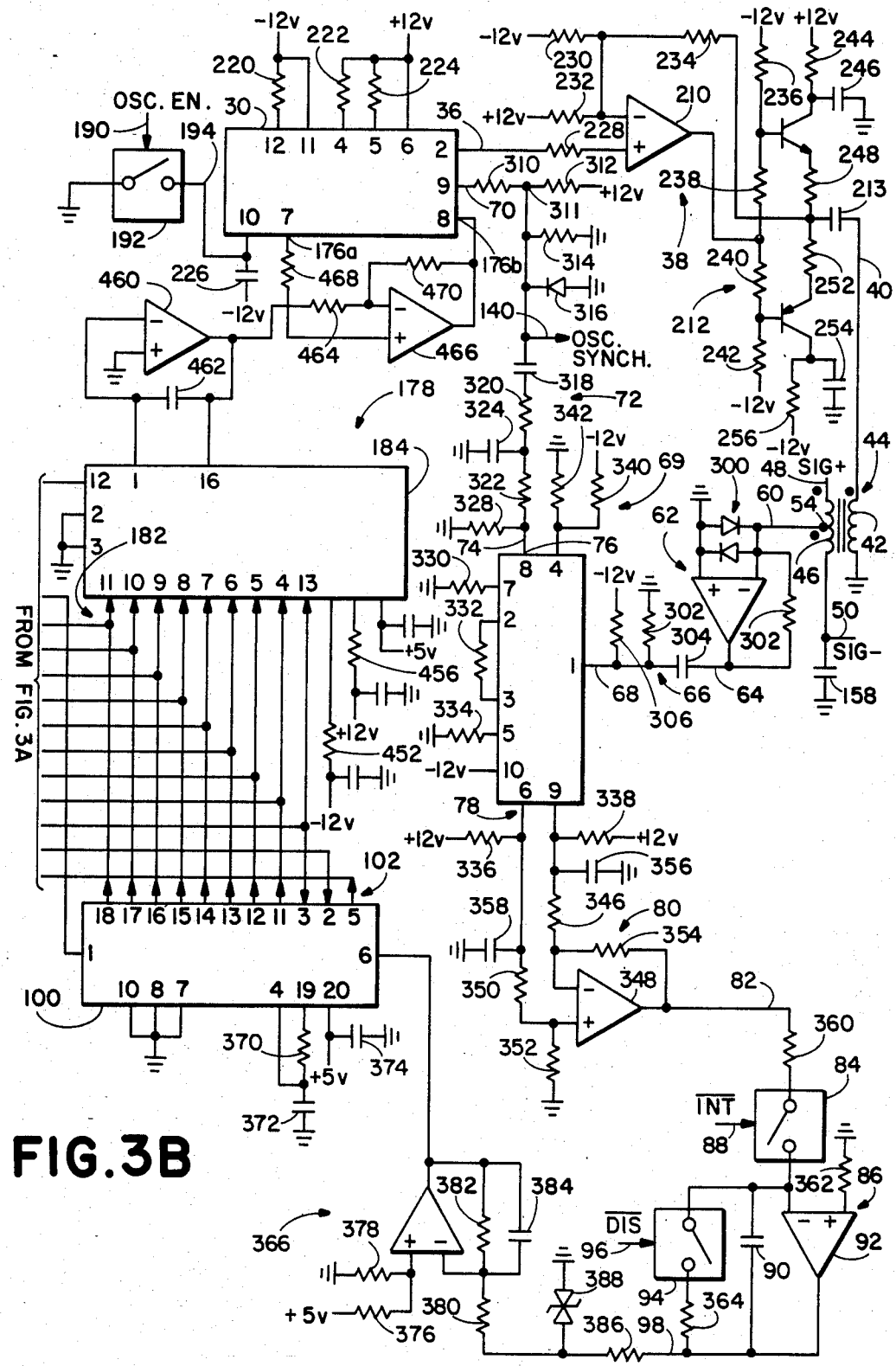

The details of the circuit utilized for generating and applying alternating current voltage signals to the touch sensing surface 18 are shown in FIG. 3.

More specifically, in the illustrated form, signal generator 30 typically comprises a conventional sine wave signal source, such as an integrated circuit XR 8038A source from Exar Company, connected in a conventional manner as shown in FIG. 3. Source 30 provides a sine wave output at pin 2, which is the output 36. Although not critical, the circuit is typically operated at a signal generator output frequency of from 15 kilohertz to 300 kilohertz, with 200 kilohertz being suitable. For reasons explained below, this frequency is automatically adjustable by the touch processing circuit. The signal source 30 also provides a square wave reference signal at pin 9 (output 70). This reference signal is used to generate synchronization signals at OSC. SYNCH. line 140 and also by the multiplier reference circuit 72 to provide reference voltage signals for analog multiplier 69.

The illustrated driver amplifier circuit 38 includes an operational amplifier 210 with a discrete push-pull follower circuit 212. The output of driver amplifier 38 is coupled by line 40 through a one microfarad ceramic DC blocking capacitor 213 to the primary winding 42 of transformer 44. Capacitor 213 prevents the transformer 44 from being driven into saturation by DC currents. Typically, the signal generator and driver amplifier combination drives transformer 44 so as to provide an approximately 12 volt peak to peak voltage across the secondary windings 48, 50 of the transformer. The same voltage appears across primary winding 42 because the specific transformer being used has a one-to-one primary to secondary voltage ratio.

In the preferred form, transformer 44 has a toroidal core. This transformer isolates current used to drive the touch sensing surface 18 from the current generated by the signal generator 30. Consequently, the only currents appearing at the center tap 54 are touch currents. With such a transformer driving configuration, circuit complexities associated with subtracting panel scanning signal currents from touch currents are eliminated.

Suitable resistors and capacitors utilized in the signal generator and driver amplifier circuits, and which have not been mentioned above, are set forth in Table I at the end of this detailed description.

Multiplexer 52 (FIG. 2) comprises a switching circuit for applying the panel scanning signals to the touch sensing surface. These panel scanning signals are applied so as to establish the alternating current voltage gradients in the desired directions across the touch sensing surface. With the illustrated touch contacting arrangement, multiplexer 52 comprises six double-pole double-throw CMOS analog switches 268–270 together with a state decoder circuit 272, interconnected as shown. As a specific example, switches 260–270 may comprise G.E. Intersil IH 5045 switches. Also, state decoder 272 may comprise a conventional 74LS02 NOR gate set. The scanning signals at the SIG+ output 48 and the SIG− output 50 are delivered to scanning inputs of the multiplexer circuit 52. In general, the switches are toggled to various states by state decoder 272 in response to control signals M0 and M1 delivered to the decoder on control lines 124, 126 from the microcontroller 108 (FIGS. 1 and 3). The multiplexer input/output lines, designated generally as 274 in FIG. 3, are connected to the respective contacts A through T of the touch sensing surface 18 as shown.

When logic zero M0 and one M1 signals are respectively applied to control lines 124, 126 by the microcontroller, the switching circuits assume a first or X touch current determination state. When in this first state, the contacts P–T of set 22 are electrically tied together and the contacts F–J of set 24 are electrically tied together. In addition, the contacts A–E and K–O are open. Also, when in the first state, the SIG+ output 48 is applied to the contacts of the set 24. In addition, the SIG− output 50 is applied to the contacts of the set 22. Under these conditions, an alternating current voltage gradient is established in the first or X direction across the touch sensing surface.

In addition, when the M0 control signal delivered on control line 124 is a logic one and the M1 control signal on control line 126 is a logic zero, the multiplexer is in a second or Y touch current determination state. In this second state, contacts A–E of set 26 are tied together and to the SIG+ output 48. In addition, the contacts K–O are tied together and to the SIG− output 50. Furthermore, the contacts P–T and F–J are open. Under these conditions, an alternating current gradient is established between the top and bottom sets of contacts in a second or Y direction across the touch sensing surface.

The multiplexer is in a third or impedance touch current determination state when both the M0 and M1 control signals are at logic zero. When in this state, contact set 22 and contact set 26 are electrically tied together and to the SIG+ output 48. Also, the remaining sets of contacts 24, 28 are open. The alternating current voltage is then simultaneously applied to two adjacent sides of the touch sensing surface. As a result, any touch current which flows at the center tap 54 corresponds directly to the impedance current generated when the touch sensing surface 18 is touched by a user. By adding an additional CMOS analog switch of the type shown, all sides of the touch panel can be simultaneously driven by the same signal. Also, impedance current can be determined in many cases with only one side of the touch sensing surface being driven. Of course, other contacts may be energized with the goal being the establishment of a uniform alternating current voltage field throughout the touch sensing surface.

Finally, the multiplexer is in a fourth or off state when both the M0 and M1 signals are logic ones. When the switches 260–270 are in the off state, the application of the panel scanning signals to the touch sensing surface is interrupted. Shifting to the off state can be done when excessive output currents are detected. This protects the touch sensing surface and circuit from these currents. Also, for circuit protection purposes, the switches are typically switched off between shifting of the panel between X, Y and Z states and also when the circuit is reset.

The following state table illustrates the above states. In this table, the letters T, B, R and L correspond to the outputs of state decoder 272 and respectively to the top, bottom, right and left sides of touch sensing surface 18.

| | | | | | | STATE TABLE | | | | |
|---|---|---|---|---|---|---|---|---|---|---|
| | | | | | | Panel Side | | | | |
| M0 | M1 | R | L | T | B | Left | Right | Top | Bottom | State Name |
| 0 | 0 | 1 | 0 | 1 | 0 | Off | Sig+ | Sig+ | Off | Third or (Z) |
| 0 | 1 | 1 | 1 | 0 | 0 | Sig | Sig+ | Off | Off | First or (X) |
| 1 | 0 | 0 | 0 | 1 | 1 | Off | Off | Sig+ | Sig | Second or (Y) |
| 1 | 1 | 0 | 0 | 0 | 0 | Off | Off | Off | Off | Off |

In operation, the microcontroller 108 repeatedly cycles the scanning of the touch sensing surface 18. This is accomplished by shifting the multiplexer between states in the following sequence for each cycle: Third - Off - First - Off - Second - Off - Third - Off. Overcurrent testing is typically performed during the Z state and in this sequence is checked at the start and end of each scanning cycle. Also, since impedance current is used in determining both X and Y position, it is desirable to update Z current determinations with greater frequency than X and Y current determinations. Other scanning sequences are of course suitable. The resulting touch current signals are then combined pursuant to the equations (a)–(e) above to determine touch locations. Typically, the multiplexer cycle for scanning through all three states is relatively rapid (30 to 1,000 hertz). In general, the slower the multiplexer frequency, the longer it takes the processing circuitry to determine a touch location.

In a similar manner, a suitable multiplexer may be used to generate the four touch currents $i_{x1}$, $i_{x2}$, $i_{y1}$ and $i_{y2}$ as explained above in connection with equations (f)–(m).

Although a transformer driven touch sensing circuit simplifies the circuitry and provides other advantages, other circuits for establishing the desired alternating current voltage gradients across the touch sensing surface may be used. For example, the sinusoidal drive signal output at 40 may be fed through a unity gain inverting amplifier to the SIG− output 50. Simultaneously, the output at 40 may be fed to the SIG+ output 48. The differential currents at the SIG+ and SIG− outputs are then obtained by a differential current detector and processed to determine touch locations. Moreover, when the touch panel is untouched, and when the nulling circuit 150 has been properly adjusted to the null, as explained below, the differential current is zero.

As an added protection feature, the touch panel application circuitry of FIG. 2 includes optional means for establishing a discharge path for discharging high voltages from the touch sensing circuit. These voltages may, for example, result from static electricity from a user of the device. In the illustrated form, this means comprises four sets of clamping diodes, one set being numbered 280 in FIG. 2. Each set is electrically coupled to a respective side of the touch sensing surface. For example, set 280 is connected to the mid-contact C at the top of the panel. Similarly, the other sets are connected to the mid-contact at the other sides of the panel. Set 280 includes a first diode 282 having its cathode connected to the touch sensing surface and its anode connected to a negative 12-volt DC supply used in the touch panel device. A second diode 284 has its anode connected to the touch sensing surface and its cathode connected to a positive 12-volt DC supply. Whenever the voltage at the top side of the panel exceeds 12 volts, plus the biasing voltage of diode 284, diode 284 conducts and discharges this voltage. Similarly, whenever the voltage drops below a negative 12 volts and the biasing voltage of diode 282, this diode conducts to also discharge the panel. Consequently, the voltage at the touch sensing surface is effectively limited to a range of plus or minus 12 volts. A first zener diode 285 has its anode connected to the negative 12-volt supply and its cathode grounded. A second zener diode has its cathode connected to the positive 12-volt supply and its anode grounded. These zener diodes have a breakdown voltage which is higher than the magnitude of the supply voltages, for example, 18 volts. Consequently, any voltage discharged through diode set 280, as well as the other diode sets, in excess of what can be dissipated by the voltage sources, is diverted through the zener diodes to ground. In addition to high voltage protection, these clamping diodes and zener diodes do not draw excess current during normal touch location detection. Therefore, the accuracy of touch determinations is not affected by leakage currents through this protection circuitry.

With continued reference to FIG. 2, circuitry for coupling offset capacitor 168 to the SIG− output 50 during third or Z stage touch current determination is shown. More specifically, the M0 and M1 outputs are coupled to switch 170 by a wired OR gate comprised of diodes 288, 290 and resistor 292. Switch 170 is a conventional inverting switch which closes when its control input is zero. This happens when M0 and M1 are both at logic zero and the panel is in its third or Z impedance current determination state. The functioning of offset capacitor 168 is explained below in connection with the description of the automatic nulling circuit 150.

Panel Output Signal Processing Circuit

Referring again to FIG. 3, current detector 62 may comprise a current-to-voltage converter operational amplifier with its inverting input connected to the center tap 54 of the transformer 44. The noninverting input of amplifier 62 is grounded. A pair of input diodes are connected in parallel and in opposite directions across the inputs of current sensing amplifier 62. These diodes protect the amplifier from excessive currents and voltages. A 220 ohm feedback resistor 302 is connected between the output 64 and inverting input of amplifier 62. When connected in this manner, amplifier 62 provides an output 64 corresponding to the currents flowing to the transformer center tap 54, and thus to the first, second and impedance touch currents. These touch current signals are filtered by a filter circuit 66 and delivered to input 68 of the analog multiplier. Filter 66 comprises a passive, high pass filter. This filter includes a 1000 picofarad DC blocking capacitor 304 and a 4.7 kilohm resistor 302 connected from analog multiplier input 68 to ground. The negative 12 volt supply is also connected through a 4.7 kilohm resistor 306 to the input 68.

Analog multiplier 69 obtains a reference signal from the output 70 of signal source 30. Output 70 is a square wave output which is shifted in phase 90° from the sine wave output 36 used to drive the transformer 44. Output 70 is connected through a 4.7 kilohm resistor 310 to a node 311, which in turn is connected through a 10 kilohm resistor 312 to the positive 12 volt supply. Node 311 is also grounded through a 3.9 kilohm resistor 314. This network divides the voltage at the square wave output to a level which is compatible with TTL logic. A diode 316 clips the negative half cycles of the square wave output. This leaves the positive half cycles as the synchronization signals at OSC. SYNCH. output 140. Node 311 is coupled by a 1000 picofarad DC blocking capacitor and a pair of 10 kilohm resistors 320, 322 to the input 76 of the analog multiplier 69. A 150 picofarad filtering capacitor 324 is connected from the node between resistors 320, 322 and ground. Also, input 76 to the analog multiplier is grounded through a one kilohm resistor 328. These latter resistors and capacitors filter the clipped square wave output to provide the reference frequency signal for the analog multiplier. Analog multiplier 69 may comprise an MC1496 analog multiplier available from Motorola Company. This circuit is connected as shown in FIG. 3 and has conventional biasing resistors listed in Table I.

With the circuit nulled, as explained below, the transformer secondary center tap is at exactly zero volts, in the absence of touch by user. This is true even without the sensing circuit. A touch by a user diverts some current to ground. Conservation of charge requires that this current also flow in the center tap wire 54. The resulting center tap current is composed of a signal at the panel drive frequency $w_0$, and a substantial noise component. X, Y and Z touch data are represented by amplitude changes in the current signals. Since only the amplitude data is of interest, a synchronous detector can be used to demodulate the amplitude-modulated touch current signals. Analog multiplier 69 is used for this synchronous detection, resulting in enhanced noise rejection and thereby more accurate touch location determinations. To accomplish demodulation, the center tap current signal is multiplied by the carrier signal derived from the output 70 of signal source 30. Mathematically, in the first or X determination state and assuming the touch presents a constant impedance to ground, $Z_t$, the resulting voltages are as follows:

PANEL VOLTAGE
$xV_o \cos w_o t$

CENTER TAP CURRENT
$$\frac{xV_o \cos(w_o t + \theta)}{Z_t} + \text{Noise}$$

MULTIPLIER OUTPUT
$$\cos\theta \frac{xV_o}{2Z_t} + \cos\theta \frac{xV_o \cos 2w_o t}{2Z_t} + \text{Noise}$$

These expressions also include constants which are cancelled during signal processing. Similar expressions are obtained during Y and Z touch current determinations. As long as the touch current phase shift $\theta$ is not ninety degrees relative to the multiplier reference signal, $\cos\theta$ is not equal to zero and the multiplier output provides usable data. Although touch current is typically capacitive, because the source 30 has a square wave output shifted ninety degrees from the sine wave output, $\theta$ is close to zero degrees and accurate information is obtained. Multiplier output amplifier and filter circuit 80 comprise a low pass filter which effectively eliminates the $V_o \cos 2w_o t$ term and much of the noise. The resulting signals correspond to $i_x$, $i_y$ and $i_z$ as set forth in equations a, b and d above. Touch location is then determined by processing these signals.

More specifically, output pin 9 of analog multiplier 69 is connected through a 47 kilohm resistor 346 to the inverting input of an operational amplifier 348. Output pin 6 of analog multiplier 69 is connected through another 47 kilohm resistor to the noninverting input of the operational amplifier. This noinverting input is also coupled to ground through a 47 kilohm resistor 352. In addition, a 47 kilohm feedback resistor 354 is connected from the output of amplifier 348 to its inverting input. Finally, 0.022 microfarad capacitors 356, 358 respectively couple pins 9 and 6 to ground.

Because $Z_t$ varies widely, signal levels at output 82 vary considerably. If $i_x$, $i_y$ and $i_z$ from output 82 were simply coinverted to digital data and then divided pursuant to equations a, b and d above, accuracy would be low for small signals, because of round-off error. Instead, the signals are integrated to give the values $t_x i_x$, $t_y i_y$, and $t_z i_z$. The integration times $t_x$, $t_y$, and $t_z$ are controlled by microcontroller 108 to maximize the magnitude of the integrated values, within limits, and to minimize error. Since $t_x$, $t_y$, and $t_z$ are known by the microcontroller, differing integration times are factored out by the microcontroller during touch location determination. Integration also provides additional noise filtering.

Referring again to FIG. 3, the amplifier output 82 is fed through a 2.2 kilohm resistor 360 to the integrator switch 84. Whenever a logic zero hold signal is applied on line 88 from decoder 130, under the control of microcontroller 108, the switch 84 closes. As a result, the amplifier output 82 is coupled to the integrating capacitor 90. The amplifier output 82 is integrated for an integration time period having a duration which is determined by the duration of the hold signal. Integrating capacitor 90 comprises a 0.022 microfarad capacitor connected from the inverting input of integrator amplifier 92 to the amplifier output 98. The noninverting input of amplifier 92 is grounded through a 2.2 kilohm resistor 362. The integrator discharge switch 94 is in parallel with the capacitor 90 with a 390 ohm discharge current limiting resistor connected between the integrator output 98 and the switch. In response to logic zero DIS signals on line 96, from decoder 130 under the control of microcontroller 108, switch 94 closes to discharge capacitor 90. Discharge takes place just prior to integration. The output 98 from integrator circuit 86 is a positive or negative analog voltage. This output corresponds to an integrated analog version of the touch currents generated at the center tap 54 of the transformer 44.

The integrator output 98 is coupled through an operational amplifier circuit 366 to the data input pin 6 of the analog to digital converter 100. The circuit 366 shifts and attenuates the integrator output 98 in order to match the input range of the analog to digital converter. Circuit 366 also comprises another filtering stage. A pair of zener diodes 388 is coupled from the node between a pair of resistors 380, 386 and ground. These diodes clamp the voltage at this node to approximately plus or minus 6.8 volts and limit the range of voltages applied to the operational amplifier circuit 366.

Analog to digital converter 100 may comprise a National Semiconducter ADC1001 circuit. The eight output data lines of this circuit are connected by lines 102 and 104 to data input/output pins 32 through 39 of microcontroller 108. Analog to digital converter 100 has a $\overline{CS}$ input pin 1 connected by line 142 to decoder 130, an $\overline{RD}$ pin 2, a e,ovs/WR/ pin 3, and an $\overline{INTR}$ pin 5. Under the control of microcontroller 108, as is known, these pins are controlled so that, upon completion of an integration cycle and the resultant digitization of the integrated touch current signal, the digitized current data is transferred to the microcontroller. The values of the resistors and capacitors coupled to the analog to digital converter 100, and also included in circuit 366 are listed in Table I.

A two's complement approach may be used in conjunction with the digitization of negative values from the integrator. From the sign of the digitized value, the quadrant of the touch location P is determined. For example, with an X-Y coordinate system having an origin at the center of the touch sensing surface 18, negative X touch current values indicate touches to the left of the origin. Conversely, positive X touch current values indicate touches to the right of the origin. Similarly, negative Y touch current values indicate touches below the origin while positive Y touch current values indicate touches above the origin.

The integration cycles are repeated, with the microcontroller shifting the multiplexer 52 (FIG. 2) through its respective states, to obtain successive digitized first, second and impedance touch current values. These values are then processed to indicate the location at which the panel is touched.

The illustrated microcontroller 108 comprises a programmable 8751 EPROM microcontroller from Intel Corporation. In addition, decoder 130 comprises a 74LS138 decoder/demultiplexer circuit. In addition, the telecommunications interface 120 may comprise a National Semiconductor DS1489 Quad Line Receiver in combination with a DS1488 Quad Line Driver. In the depicted configuration, microcontroller pin 10 comprises a serial input port, pin 9 comprises a reset input which, if at a logic 1 level, resets the touch detection circuit, and pin 13 comprises an external interrupt input. Microcontroller output pin 6 is used for sending a request to send signal, pin 7 is a data transmission ready to send signal line, and pin 11 comprises a serial output. These pins are controlled in a conventional manner to enable microcontroller 108 to send or receive data, via interface 120, over a telecommunications network. In addition, serial transmission and reception of data is possible. Parallel output latch 112 may comprise a 74LS377 octal-D flip-flop with eight parallel data output pins and corresponding input pins. Microcontroller 108 controls latch 112 at pin 11. In addition, the enable input pin 1 of latch 112 is connected to an input/output pin 8 of the microcontroller. In response to enable signals from the microcontroller, parallel transmission of data from latch 112 occurs.

Control switch 198 may comprise a manually operated switch having seven outputs connected to microcontroller input pins 21–27. These ouputs are at logic 1 or logic 0 levels, depending upon the switch settings. Typically, the logic levels at pins 13 and 14 determine the mode or manner by which the existence of a touch is determined. For example, if these pins are at respective logic 0 and logic 1 levels, a "touch on make" mode is indicated. In this mode, upon the initial detection of a touch, touch location data will be sent via latch 112 or interface 120. If the logic levels are 1 and 0, a "touch on break" mode is indicated. In this case, upon releasing of a touch location (i.e. by a user lifting his or her finger from the touch sensing surface), touch location data is sent. Furthermore, if the logic levels of these outputs are both 0, a "continuous mode" is indicated. In this mode, touch location data is continuously sent so that movement of a user's finger across the touch sensing surface is monitored. In addition, the logic levels of pins 11 and 12 determine whether parallel output latch 112 or the serial output is to be used, and also the baud rate of the telecommunications output (i.e. 1200 baud, 9600 baud, 19,200 baud). The logic levels of pins 9 and 10 are used to designate parity of the data. Finally, the logic level of pin 8 determines whether data is transmitted in an 8-bit binary form, or in some other format. Switch 198 can take virtually any form and may be larger or smaller as needed to control designated parameters involved in signal processing.

To complete the description of these components, pins 18 and 19 of the microcontroller are coupled through 33 picofarad capacitors to ground. A quartz crystal is connected between these pins to provide an oscillator reference frequency for the microcontroller. In addition, the touch panel circuit 56 has a number of 0.1 microfarad power supply decoupling capacitors (e.g. one being numbered as 374).

The operation of the microcontroller 108 to perform the integration and touch location determinations, as well as for use in automatic nulling and automatic frequency control, are explained below with reference to the flow charts of FIGS. 9–16.

Automatic Nulling Circuitry

As another aspect of the present invention, the panel output signal processing circuit includes the nulling circuit 150 for nulling the first, second and impedance touch currents. By "nulling", it is meant that touch currents at center tap 54 are effectively offset to zero at times when the touch sensing surface 18 is not being touched. Because of this nulling, touches of the type which generate relatively low touch currents, such as with a gloved finger, can more accurately and readily be determined. That is, they are not masked by underlying ambient current signals at the center tap which arise from sources other than the touch. Consequently, the touch panel device can be used in a wide variety of relatively noisy environments, including in conjunction with electroluminiscent displays.

In general, offset or nulling currents are in effect added to the currents from transformer center tap 54 to null the X, Y and Z touch currents under no touch conditions. The magnitude of the nulling touch currents is controlled by the microcontroller 108 and is automatically adjusted as processing continues. In one specific nulling circuit implementation, an effective capacitive load is coupled by the nulling circuit to one of the first and second panel scanning outputs 48, 50. The magnitude of this capacitive load is varied in response to nulling control signals from microcontroller 108 to thereby vary the nulling of current signals at transformer center tap 54.

One specific embodiment of a nulling circuit is shown in FIG. 3. In this case, the nulling circuit 150 includes a nulling control device, such as a latch 390. Latch 390 is like parallel output latch 112 and receives nulling signals on bus 154 from data pins 32–39 of the microcontroller. Clocking signals are also delivered from the microcontroller to pin 11 of latch 390. In response to an enable input to pin 1 of latch 390, from line 156 of decoder 130 and under control of the microcontroller, digitized nulling control signals are transferred from the latch 390 inputs to the latch outputs. As explained in connection with the flow charts below, this typically occurs when microcontroller determines that the touch sensing surface is not being touched and that any of the X, Y or Z touch currents are too high. The outputs of latch 390 are connected as shown to the control pins 1, 8, 9 and 16 of a pair of switching circuits 392, 394. Exemplary switching circuits include GE Intersil DG211 CMOS four-channel analog switches. The output pins 3, 6, 11 and 14 of these switches are electrically interconnected and are also connected to one of the panel scanning outputs (i.e. to SIG+ output 48) by the line 152. The input pins of these switches are coupled to capacitors in respective capacitor banks 396, 398. The magnitude of the capacitance coupled to the SIG+ panel scanning output depends upon the logic levels of the signals at the latch outputs. More specifically, pins 2, 7, 10 and 15 of switch 392 are grounded through respective 1, 2, 4 and 8 picofarad capacitors 400–406. Similarly, pins 2, 7, 10 and 15 of switch 394 are grounded through respective 16, 32, 64 and 128 picofarad capacitors 408–414. With this arrangement of capacitors, the capacitive load added to the SIG+ output by nulling circuit 150 can range, in one picofarad steps, from zero to 255 picofarads. If desired, switches 392, 394 and latch 390 may be changed to components of larger capacity to accommodate the use of larger capacitor banks 396, 398.

Various methods may be utilized for determining the capacitive load on the SIG+ output that results in the most effective nulling of a particular touch current. Assume the nulling capacitive loads are determined for each of the X, Y and Z touch current measuring states. These loads typically remain fixed until such time as any of the touch currents generated from the touch sensing surface under no touch conditions exceed a predetermined null threshold. When this happens, the capacitive load is adjusted to bring that touch current measurement within the threshold.

In one approach for automatically selecting the appropriate capacitor load, assume that the impedance touch current under no touch conditions exceeds the null threshold. In this case, the largest nulling capacitor 414, at midrange of the capacitor bank, is coupled to the SIG+ output. Assume the Z touch current under no touch conditions is then negative and in excess of the desired threshold. This implies that capacitor 414 is not large enough for nulling purposes. The next biggest capacitor 412 is then added to the SIG+ output and the Z touch current under no touch conditions is rechecked. In contrast, assume that, following the addition of capacitor 414 to the SIG+ output, the Z touch current under no touch conditions is positive and in excess of the null threshold. This implies that capacitor 414 is too high. Capacitor 414 is then dropped out of the circuit and replaced by capacitor 412. Null checking then continues. Eventually, the system iterates to the correct capacitive load to achieve the desired nulling. Of course, other methods of establishing the capacitive load are also suitable.

Offset capacitor 158 (FIGS. 1 and 3) typically comprises a 120 picofarad capacitor which couples the SIG— output to ground. This capacitor provides an initial nulling offset to the touch currents at center tap 54. This initial offset is in a direction such that capacitance falling somewhere in the midrange of capacitor banks 396, 398 typically nulls the X and Y touch currents. During Z touch current determination, especially if all sides of the touch sensing surface are being simultaneously driven by the SIG+ output, the leakage currents are relatively higher. Consequently, additional offset capacitance may be used to provide an offset which initially places the impedance touch currents under no touch conditions somewhere in the midrange of the total capacitance of nulling circuit 150. Thus, an additional offset capacitor 168 is added to the SIG— output during impedence touch current determinations. As previously explained in connection with FIG. 2, switch 170 connects capacitor 168 in place only at times when Z current measurements are being made. Otherwise this capacitor is switched out of the circuit. Offset capacitor 168 is typically about 650 picofarads. Capacitor 168 may be left in the circuit continuously if the capacitance range of auto null circuit 150 is increased.

Assume that impedance touch currents are being measured and that no touch is present. In this case, when the total stray capacitance and offset capacitance coupled to the touch panel equals the nulling capacitance $C_z$, from the nulling circuit 150, no current flows through the transformer center tap 54 to virtual ground. This constitutes a null condition and the center tap current is solely a function of touch impedance. This is because there are no significant voltage changes with changes in touch location. The nulling capacitances $C_x$ and $C_y$, coupled to the touch sensing surface by the nulling circuit during X and Y touch current determinations, are similarly adjusted to yield a center tap null current under no touch conditions. When nulled for all three states, current flows from the center tap 54 only when the touch sensing surface is touched.

To further null the touch signals when the touch sensing surface is untouched, microcontroller 108 includes software for generating offset nulling signals. These offset signals in effect fine tune the touch current nulls under untouched conditions. This is explained more fully below in the discussion of the FIG. 9-16 flow charts.

Nulling circuit 150 may be implemented in a variety of forms. For example, as shown in FIG. 6, latch 390 may be replaced by either a loop counter or a shift register 422 having its outputs coupled to the respective control inputs of switches 392, 394. In the counter implementation, in response to count pulses from microcontroller 108 on line 154, counter 422 increments its count and causes a variation in the capacitive load connected to the SIG+ output. The capacitance is varied one successive step at a time until the desired nulling capacitance is determined for each touch current determination state. In the shift register implementation, the shift register 422 has a data input coupled to microcontroller 108 and a strobe input connected to a strobing output of the microcontroller. In response to strobe signals, the null signal data, which designates a particular combination of nulling capacitors is loaded from the microcontroller into the shift register. The iteration technique described above in connection with FIG. 3 may be used to determine the proper nulling data for the shift register.

In another implementation, multiplying digital analog converter circuits under the control of microcontroller 108, are used to vary the capacitive load which is coupled to the touch sensing circuit. In the FIG. 4 embodiment, a conventional multiplying digital to analog converter circuit 424 has an input connected to the output 40 of the panel supply amplifier 38 (FIGS. 1 and 3). The output of circuit 424 is connected to the noninverting input of an operational amplifier 426, which has a feedback resistor 428 between its output and inverting input. Depending upon the type of operational amplifier 426 used, a nulling capacitor 430 is either (a) coupled from the inverting input of the operational amplifier to the SIG— panel scanning output 50 (as shown in solid lines in FIG. 4); or (b) to the output of the operational amplifier (as shown in dashed lines in FIG. 4). FIG. 5 is similar to FIG. 4 in its use of a multiplying digital to analog converting circuit 424. However, in FIG. 5 the output of circuit 424 is connected directly to a five hundred and fifty picofarad nulling capacitor 430. A thirty-three kilohm reistor 431 decreases the full scale range of circuit 424, while a twenty-two picofarad capacitor 433 helps prevent spurious oscillations in circuit 424. Nulling capacitor 430 thus comprises one form of capacitive loading means for the nulling circuit. Microcontroller 108 generates nulling control signals on lines 154, which are fed to the multiplying digital to analog converting circuit 424. In response to these signals, the capacitive loading effect of capacitor 430 on the SIG— output is varied. The capacitive loading is varied as explained above to adjust the X, Y and Z touch currents to zero when the panel is untouched.

In the FIG. 7 embodiment, signal source 30 comprises a conventional quadrature oscillator having a first output 36 connected to the panel supply amplifier 38. In this embodiment, the multiplying digital to analog converter circuit 424 obtains its input from an output 70 of the quadrature oscillator which is 90° out of phase from the output 36. The multiplying digital to analog converter circuit output is connected through a resistor 432 to the SIG− panel scanning output 50. Because the panel scanning output 36 and the output 70 are phase shifted, resistor 432 in effect behaves as a capacitive load on the SIG− output. The magnitude of this effective capacitive load is varied in response to nulling signals, delivered to circuit 424 on lines 154, from the microcontroller 108. This magnitude is adjusted to establish a null condition for each of the touch currents.

FIG. 8 discloses a nulling circuit implementation in which offset current is directly added to touch currents from center tap 54 at a location ahead of current detector 62. In this embodiment, center tap 54 is connected to the inverting input of an operational amplifier 434. A feedback resistor 436 is connected between the output of amplifier 434 and its inverting input. The output of operational amplifier 434 is connected through a resistor 438 to the inverting input of another operational amplifier 440. Operational amplifier 440 also has a feedback resistor 442 connected between this output, which corresponds to the input 60 of the current detector, and to its inverting input. The noninverting inputs of each of the operational amplifiers 434, 440 are grounded. Moreover, the output of multiplying digital to analog converter circuit 424 is coupled through a capacitor 444 to the inverting input of operational amplifier 440. A first input to the multiplying digital to analog converter circuit 424 is obtained from the output 40 of the panel supply amplifier 38. A second or control input to circuit 424 comprises the nulling signals from the microcontroller. Multiplying digital to analog converter circuit 424, when connected in this manner, adds a nulling current to the touch current signals obtained at the center tap 54. The magnitude of this nulling current is adjusted by the multiplying digital to analog converter circuit 424, under the control of the microcontroller, so as to null the touch currents when the panel is untouched.

In each of the above examples, automatic nulling of the touch current signals from the touch panel device is accomplished. Moreover, this nulling can be accomplished as the touch panel device operates to null the touch currents on an ongoing basis.

Auto Frequency Control

With reference to FIGS. 1 and 3, the touch panel device includes a means for automatically shifting the frequency of the panel scanning signals away from frequency interference spectra in the environment in which the touch panel system is used. This effectively negates the effect of the interference frequency spectra on touch current determinations. One principal source of such interference spectra is the horizontal flyback signals of cathode-ray tube displays. The frequency of these flyback signals can vary from device to device and also can vary as a particular device is operated. By providing for automatic frequency shifting away from these interference frequency spectra, there is no need to specifically design a variety of touch panel devices for the various expected interference frequency spectra. That is, the touch panel system of the invention automatically compensates for such variations and does not have to be customized to avoid interference frequency sprectra.

In the illustrated embodiment, the signal source 30 comprises a variable frequency signal generator having an output frequency controlled by frequency control signals at a frequency control input 176 (FIG. 1). Specifically, signal source 30 may comprise a voltage controlled oscillator which produces variable frequency outputs in response to signals from automatic frequency control circuit 178.

Microcontroller 108 determines from the touch current data whether the drive frequency should be shifted. In one method, this determination is made by monitoring the rate at which adjustments in nulling of the touch current outputs is required. If the rate of change of nulling exceeds a predetermined rate, the drive frequency is assumed to be at a level which is too close to the frequency of interference signals. In this case, the microcontroller 108 controls automatic frequency control circuit 178 to adjust the output frequency of the panel scanning signal obtained from the signal generator 30. Typically, initial frequency adjustments are relatively large. After an initial operating frequency has been selected, updating of the operating frequency is typically accomplished in small increments. In addition, as explained in connection with the flow charts below, a mechanism is provided for predetermining the direction in which the frequency should be adjusted.

Referring to FIG. 3, digitized frequency control signals are transmitted from outputs 32 through 39 of the microcontroller on busses 104 and 182 to the data input pins 4–11 of a digital to analog converter 184. The digital to analog converter (DAC) forms a part of the automatic frequency control circuit and may comprise an Analog Devices AD7524 DAC interconnected as shown in FIG. 3. Filtering capacitors and biasing resistors utilized in this circuit are listed in Table I. The $\overline{WR}$ input 13 of circuit 184 is coupled to the $\overline{WR}$ output 16 of the microcontroller. In addition, the $\overline{CS}$ pin 12 of circuit 184 is connected by line 186 to the decoder 130. Under the control of microcontroller 108, whenever the $\overline{CS}$ and $\overline{WR}$ inputs are both at a logic low level, digital to analog converter 184 responds to data bus inputs at pins 4–11. When the $\overline{CS}$ signal is at a high logic level, the data bus inputs are locked out. In contrast, when the $\overline{WR}$ input is high, the digital to analog converter 184 holds the last data present at the data inputs when the $\overline{WR}$ or $\overline{CS}$ signals assumed a high logic state. The output at pin 1 of DAC circuit 184 is connected to the inverting input of an amplifier 460. Amplifier 460 has its output connected to the feedback pin 16 of DAC 184. A one microfarad capacitor 462 interconnects pins 1 and 16 of the DAC and the noninverting input of amplifier 460 is grounded. In addition, the output of this amplifier is connected through a 68 kilohm resister 464 to the noninverting input of another amplifier 466. The FM bias pin 176a of signal source 30 is connected through a 47 kilohm resistor to the noninverting input of amplifier 466. Finally, the output of amplifier 466 is connected to the frequency sweep input 176b of source 30 and also through a 10 kilohm feedback resistor 470 to its inverting input. When configured as described above, in response to frequency control signals from microcontroller 108, the frequency of signal source outputs 36, 70 is variable over a range from about 130 kilohertz to about 230 kilohertz. This range can be increased or decreased as desired.

To protect the touch panel device from excessive currents, microcontroller 108 continuously monitors the digitized touch current signals. Typically, the impedance touch current signal is specifically monitored for excessive current, although the other touch current signals may be monitored as well. If the impedance touch current signal exceeds a predetermined value, microcontroller 108 causes decoder 130 to send an OSC. EN. signal on line 190 to the control input of the source disabling switch 192. When this happens, pin 10 of signal source 30 is grounded and the output of the signal generator is shut off. Simultaneously, the panel scanning sequence is typically shifted to its off state. This opens the connections between the panel contacts and the touch detection circuitry. This also protects the touch processing circuitry from excessive touch currents.

The above described touch current system requires relatively little power (i.e., typically less than three watts) for its operation. In addition, circuit board size, the number of components used, and costs are reduced. Also, typically the entire device is standard for a wide range of applications, although the offset capacitors 158, 168 are sometimes varied to fit specific environments. Therefore, user adjustments are minimized. Also, multiplexer 52 can be used, without redesign, for coupling from one to six pins to each side of the touch sensing surface. This adds further versatility to the touch panel device.

Touch Current Processing

The flow charts of FIGS. 9-16 illustrate one sequence of operation of the touch panel system of FIG. 1. These flow charts include automatic nulling and automatic frequency control sequences, as well as sequences for processing the digitized touch currents into touch location data.

Figure 9:
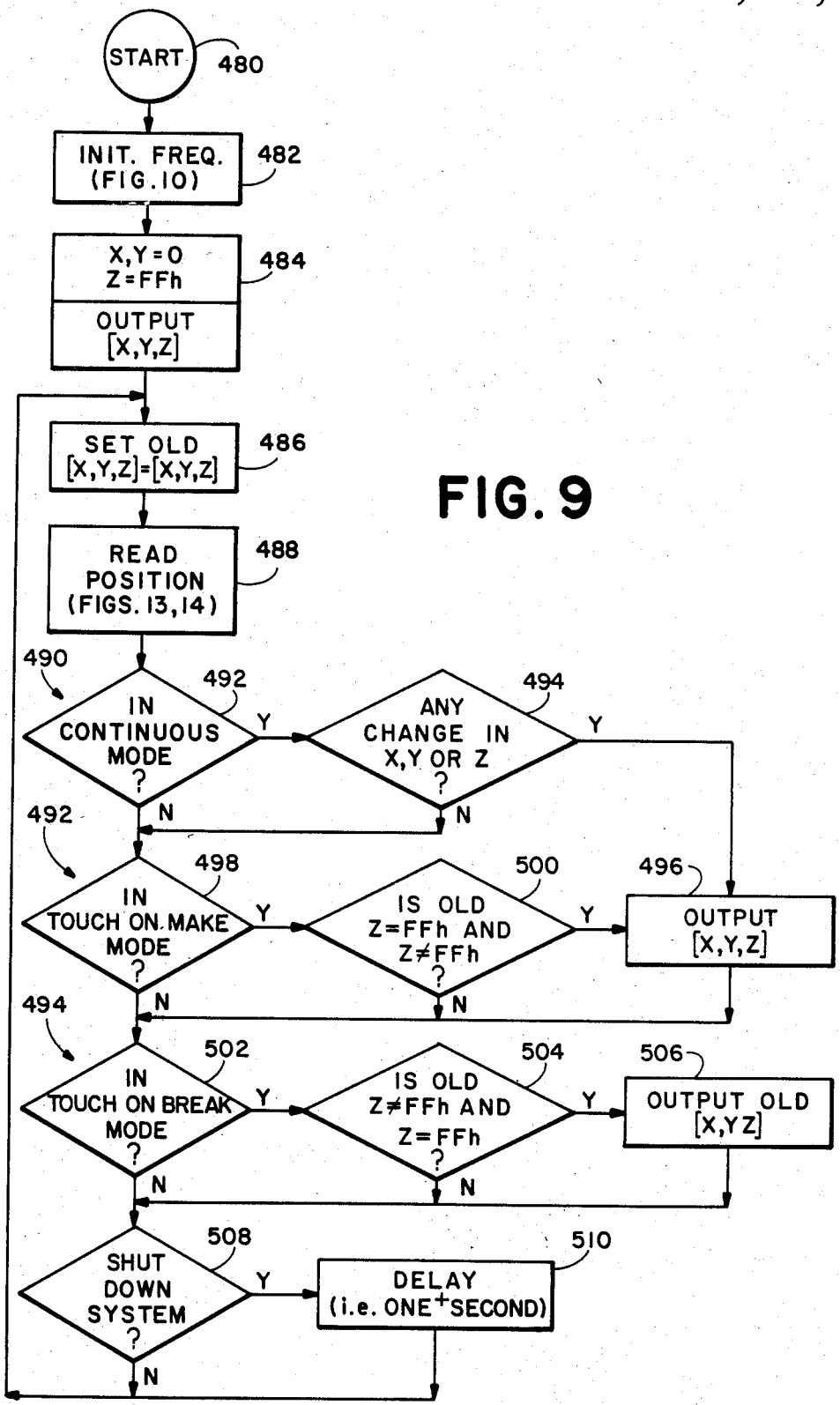
FIG. 9 is a flow chart of an overall touch location determining sequence utilized by the microcontroller of FIG. 1.

FIG. 9 illustrates an over-all approach. Commencing at a start block 480, which may involve resetting the circuit, an INIT. FREQ. block 482 is reached. Block 482 refers to a subroutine which selects an initial touch panel operating frequency and which also calls an initial nulling subroutine. At the next block 484, X and Y are set equal to zero. Also, Z is set equal to FFh. In this description, FFh indicates the number FF hexadecimal (255 base 10). These values correspond to a no touch situation. Following this, the device outputs X, Y and Z to indicate that this initialization is complete. Thereafter, at a block 486, the old X, Y and Z values are stored. A block 488 is then reached, at which new X, Y and Z values are determined. Block 488 refers to subroutines set forth in FIGS. 13 and 14.

From block 488, processing continues through loops 490, 492 and 494. These loops determine whether the new X, Y and Z values are recognized when the touch panel device is in a particular mode of operation. More specifically, loop 490 includes a decision block 492 for checking whether the device is being operated in the "continuous mode." This depends on the setting of the control switch 198, as explained above in connection with FIG. 3. If yes, the touch panel device looks for any changes in the X, Y or Z values at a decision block 494. If there are no changes, processing continues to a block 498. If there are changes, at a block 496, the new X, Y and Z values are transmitted from the touch panel detection circuitry. The procedure then continues.

Loop 492, which follows loop 490, evaluates the "touch on make" mode in cases where this mode is selected by control switch 198. This mode involves outputting new X, Y and Z values at the first occurrence of any change in these values. If the touch panel device is in the touch on make mode, a decision block 500 is reached from block 498. If the prior Z value was equal to FFh (no touch) and the new Z value is not equal to FFh, then the panel has just been touched. In this case, block 496 is reached and the new X, Y and Z values are transmitted. Processing then continues from block 496 or from the no branch of block 500 in the event a new touch has not been determined.

At block 502, in loop 494, an evaluation is made as to whether the touch panel device is in the "touch on break" mode. This is determined by the setting of control switch 198. If so, the touch panel device looks for the first instant that a user releases his or her touch from the touch sensing surface. At block 504, a determination is made as to whether the previous Z corresponds to a no touch situation and whether the new Z corresponds to a no touch situation. If yes, the touch sensing surface has just been released and the stored X, Y and Z values are transmitted. These values correspond to the location at which a user's finger or stylus was lifted off the touch sensing surface. From block 506, as well as from a no branch of block 504, processing continues.

At block 508, a determination is made as to whether the signal source 30 has been turned off by the OSC. EN. signal. If so, an arbitrary delay, for example, of slightly more than one second, is added at block 510 to give the source of excessive current time to clear. Processing then continues after this delay. Although not shown in FIG. 9, the amount of continuous delay can be monitored. Also, the entire process may be stopped if the cumulative delay exceeds a predetermined time. If this were to occur, the microcontroller 108 has continued to disable the signal generator 30 beyond the set maximum time because of excessive touch currents. This indicates that the system needs to be checked.

Figure 10:
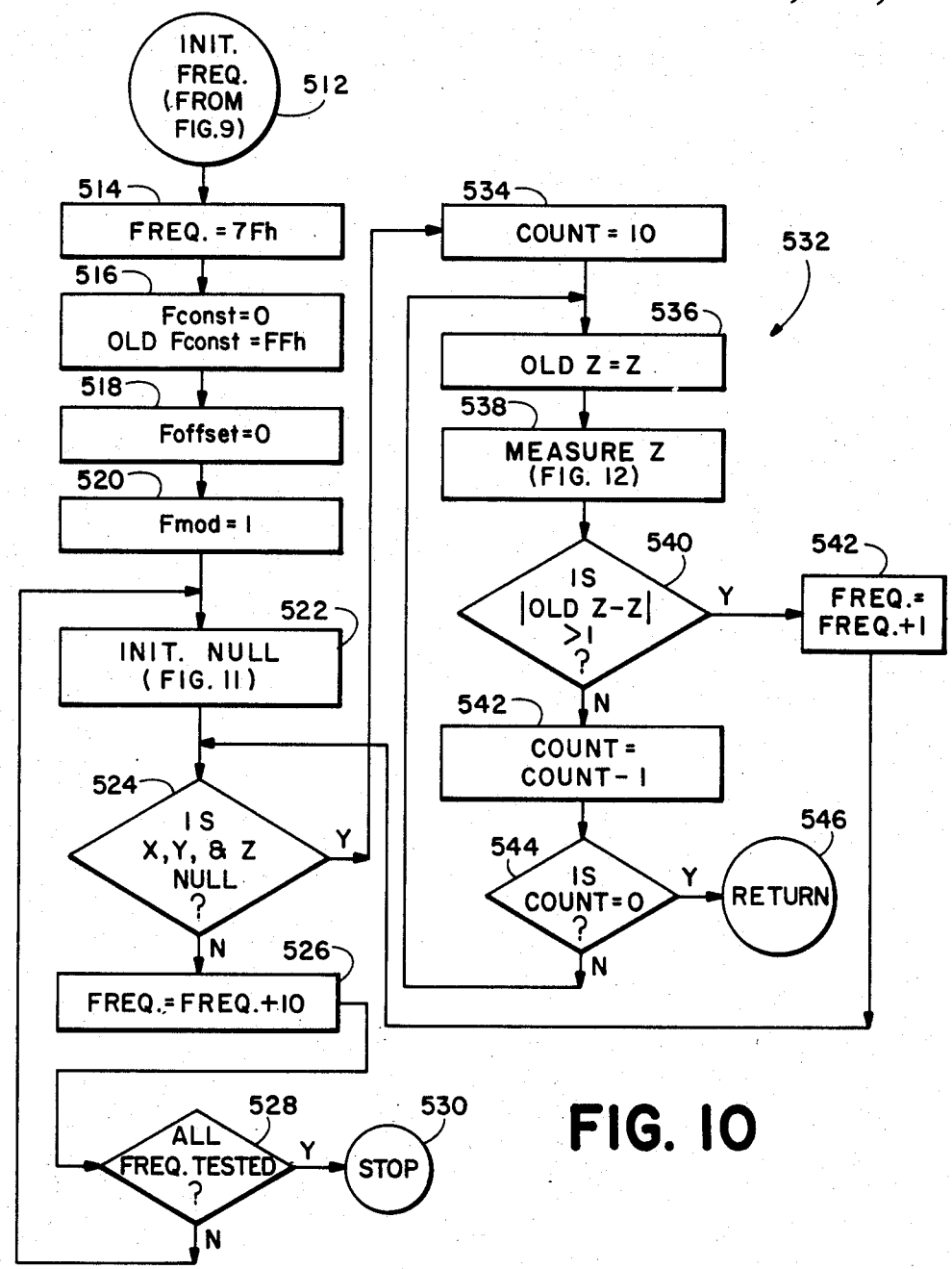
FIG. 10 is a flow chart of an initial panel scanning signal frequency determination sequence utilized by the microcontroller of FIG. 1.

With reference to FIG. 10, the INIT. FREQ. subroutine, accessed from FIG. 9, commences at a block 512. At block 514, the frequency is initially set to 7Fh. This is the initial frequency value sent to digital to analog converter 184 for use in controlling the frequency of signal generator 30. This initial value starts at half way through the range of digital to analog converter 184. At succeeding blocks 516, 518 and 520, certain initial conditions are set. A variable, Fconst, is initially set equal to zero and represents the number of scanning cycles that have taken place wherein no touch was detected and for which the frequency setting has remained constant. Old Fconst is set equal to FFh, as it is initially assumed that the frequency is stable. An initial Foffset is also set equal to zero. In addition, an Fmod flag is set equal to one. The Fmod flag controls the direction of frequency changes. When Fmod is one, frequency adjustments are in an upward direction. If Fmod is negative one, frequency adjustments in a downward direction are indicated. At block 520, an INIT. NULL block 522 is reached. At this block, an initial null subroutine is followed to initially null the X, Y and Z touch currents to a rough null or zero level. This subroutine is described below in connection with FIG. 11.

Thereafter, at decision block 524, a determination is made as to whether the X, Y and Z touch current values are satisfactorily nulled. This is accomplished by comparing these values with a null threshold. If the answer is no, this indicates that the initial frequency is too close to an interference frequency spectrum. For example, the initial frequency may be close to a harmonic of the horizontal flyback frequency of a cathode-ray tube monitor with which the apparatus is being used. In this case, at block 526 the frequency is stepped by a large step, i.e., ten units. This is accomplished via the interaction of microcontroller 108 and the automatic frequency control circuit 184. An evaluation is then made at a decision block 528 as to whether all frequencies have been tested. If the answer is yes, the process stops at block 530. This would be an extremely rare circumstance when none of the possible operating frequencies produced touch currents with an acceptable null. If all frequencies have not been tested, the process returns from block 528 to block 522 for renulling of the signals.

Assume that the X, Y and Z touch current signals are within the threshold evaluated at block 524. In this case, a subloop 532 is reached. This subloop evaluates whether the touch currents, such as the Z touch current, have remained satisfactorily constant for a predetermined number of cycles. If so, the initial operating frequency is set and remains set until it is updated as explained below. If the Z touch current is not sufficiently constant over these cycles, then the frequency is changed by a small increment and the initial frequency selection procedure continues. Eventually, a frequency is selected which results in a Z touch current that is nearly constant for the predetermined number of samples. The initial frequency subroutine is then over.

More specifically, the yes branch from block 524 passes to a block 534 at which the number of samples is set. Although any number of samples may be selected, ten is a suitable example. At block 536, the old impedance touch current value Z is stored and, at block 538, the new impedance touch current value is measured. Measurement of the touch currents is described in connection with FIG. 12 below. At block 540, the absolute value of the difference between the prior Z and new Z is compared to a threshold, i.e. 1. If greater than the threshold, block 542 is reached and the drive frequency is incremented by a small step, i.e., one increment. Processing then continues at block 524. However, if the impedance touch current has remained constant within the tolerance of this threshold, block 542 is reached from the block 540 and the count is decremented by one. At the next block 544, a determination is made as to whether all of the samples have been checked. If not, processing continues at block 536. If so, then the Z touch current, or any other touch currents being evaluated for constancy, has remained sufficiently constant for the predetermined number of samples. The initial operating frequency which produced this result is then established. At block 546, processing returns to block 584 (FIG. 9).

The INIT. NULL subroutine, accessed from FIG. 10, commences at a block 550 in FIG. 11. The nulling illustrated in this subroutine selects the required capacitive nulling employed to null each of the touch current signals. Similar routines are suitable for the various nulling circuit implementations depicted in FIGS. 4 through 8. At block 552, the integrator gain setting is initially set equal to zero. This corresponds to integrating for the longest possible time, for example, approximately thirty milliseconds. In addition, the null control signal is initially set equal to zero. The null control signal is the signal delivered from the microcontroller 108 to latch 390 (FIG. 3). Also, a last null flag is initially set equal to false. This flag is used in subsequent updating of the null.

At block 554, BIT is set equal to 80 h. BIT corresponds to the output from latch 390 in hexadecimal format. When BIT is set at 80 h, the midrange capacitor (i.e., 128 picofarad capacitor 414) is selected and coupled to the SIG+ panel scanning output. At block 556, the null control signal is then set equal to the null control signal plus BIT. The first time through the loop, the null control signal would equal 80 h. If the X touch current is being nulled, at block 558 the X touch current is measured in accordance with the subroutine of FIG. 12. Similar measurements are made of Y touch currents and Z touch currents when they are being nulled.

At block 560, a determination is made as to whether the value of the measured X touch current is greater than zero (or Y or Z touch currents in nulling of these latter touch currents). If the answer is yes, then too much capacitance has been coupled to the SIG+ output. In this case, at block 562 the null control signal is set equal to the null control signal minus BIT. This removes capacitance from the automatic nulling circuit. Initially, the capacitor 414 would be decoupled from the SIG+ output. If at block 560, the measured touch current is not greater than zero, this indicates that not enough capacitance has been coupled to the SIG+ output. The value of BIT is then halved at block 564. At block 566, a determination is made as to whether the halved bit value is zero. A yes answer corresponds to a completion of the capacitor selection process. The first time through, the answer would be no and processing returns to block 556. If at block 560 a determination is made that not enough capacitance is in the automatic nulling circuit, block 562 is bypassed. Also, at block 566 the capacitor 414 and the capacitor 412 are both added to the circuit. Processing then continues. In contrast, if at block 560 a determination is made that too much capacitance is in the automatic nulling circuit, at block 556 capacitor 414 has been dropped and the capacitor 412 has been added. This capacitor selection procedure stops when the total capacitance coupled to the SIG+ output results in a value of null touch current which is closest to zero, but slightly negative. After the various capacitor totals have been checked, at block 568, the X, Y and Z touch currents resulting under no touch conditions are measured. Also, at block 570, the null offsets for X, Y and Z are set equal to these measured values. These measured values correspond to the residual X, Y and Z touch currents present under no touch conditions after the initial nulling is complete. These offsets are used during subsequent determinations of whether to update the nulling; that is, whether to change the capacitors coupled by the automatic nulling circuit 150 to the SIG+ output. From block 570, the subroutine continues to block 582 and returns to block 524 of FIG. 10.

The touch current measuring sequence is shown in FIG. 12 and starts at a block 590. From block 590, at block 592, multiplexer 52 is controlled to drive the panel in the desired state for touch current determination. For example, the SIG+ output is coupled to the right-hand side of the panel and the SIG— output is coupled to the left-hand side of the panel during X touch current determination. At block 594, the appropriate null state is set. In other words, the previously determined setting of latch 390 for the particular touch current determination, i.e., the X touch current determination, is applied to couple the previously determined capacitors to the SIG+ output. At block 596, switch 94 (FIGS. 1 and 3) is closed to discharge the integrating capacitor 90 in preparation for integration. At block 598, an analog to digital offset is determined. Specifically, analog to digital circuit 100 may produce an output which is other than 7 Fh (midrange) when the integrating capacitor is discharged. An A/D offset is stored and used to compensate for any such deviation.

At block 600, integration takes place for a period of time which is equal to the maximum integration (MAX.-TIME) period divided by two raised to the power of the gain setting. Initially, the gain is set equal to zero. However, the gain is adjusted during the read position subroutine of FIG. 13 as explained below. In general, to reduce round-off error, it is desirable to integrate for the longest time that does not produce touch currents which, when digitized, fall outside the range of analog to digital converter circuit 100. At block 602, the value of the measured touch current, whether it be X, Y or Z touch current, is set equal to the digitized integrator output. At block 604, the value is adjusted to remove the analog to digital offset as determined at block 598. Then, at block 606, the multiplexer 52 is toggled to place the switches in their off states. The above sequence is repeated for each touch current that is to be measured. Following completion of the touch current measurements, the process returns at block 608 to the portion of the process which accessed the measurement subroutine.

Figure 13:
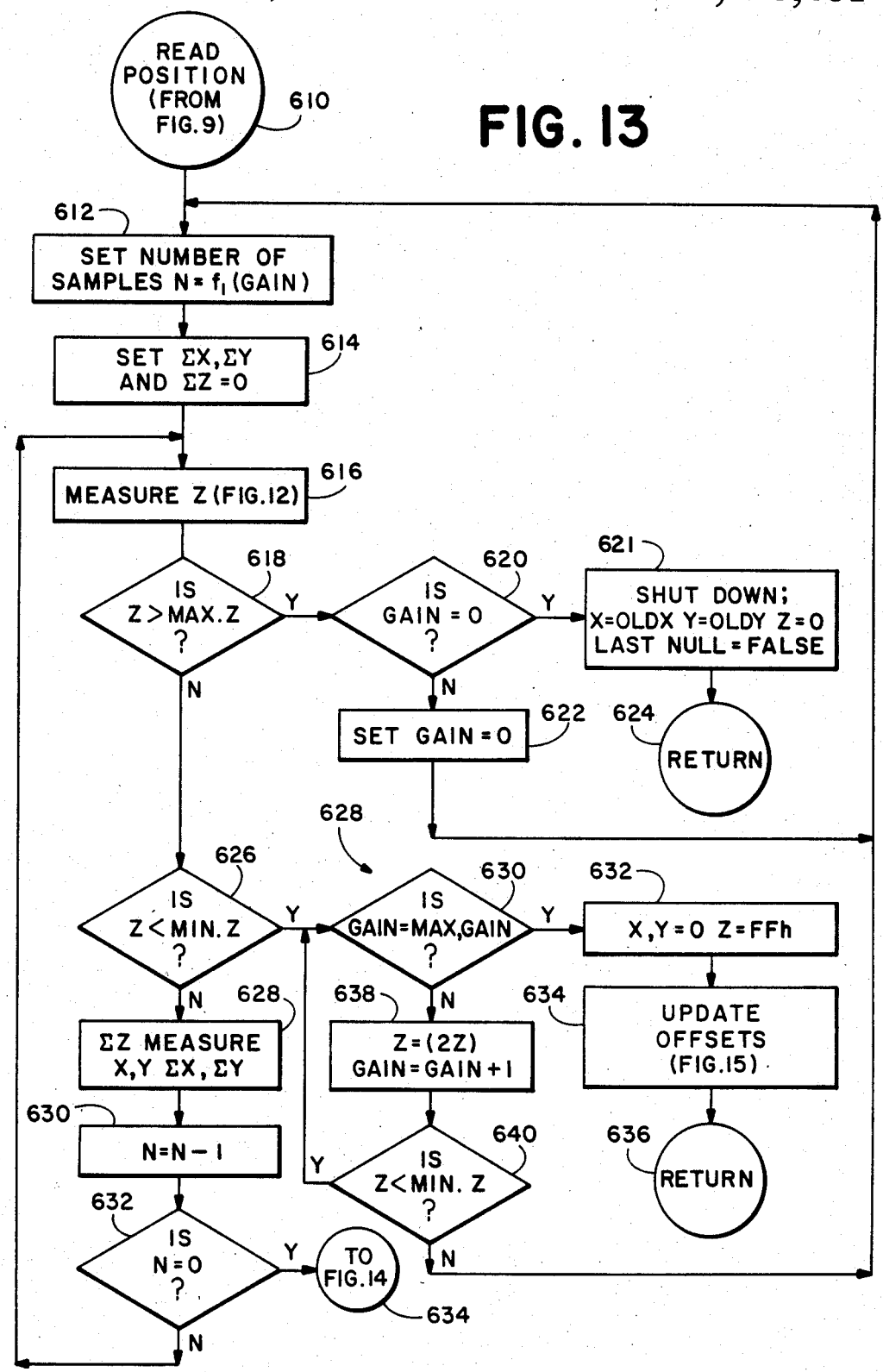
FIGS. 13 and 14 are flow charts of the touch position determining sequence utilized by the microcontroller of FIG. 1 in determining touch location from the measured touch signals.
Figure 14:
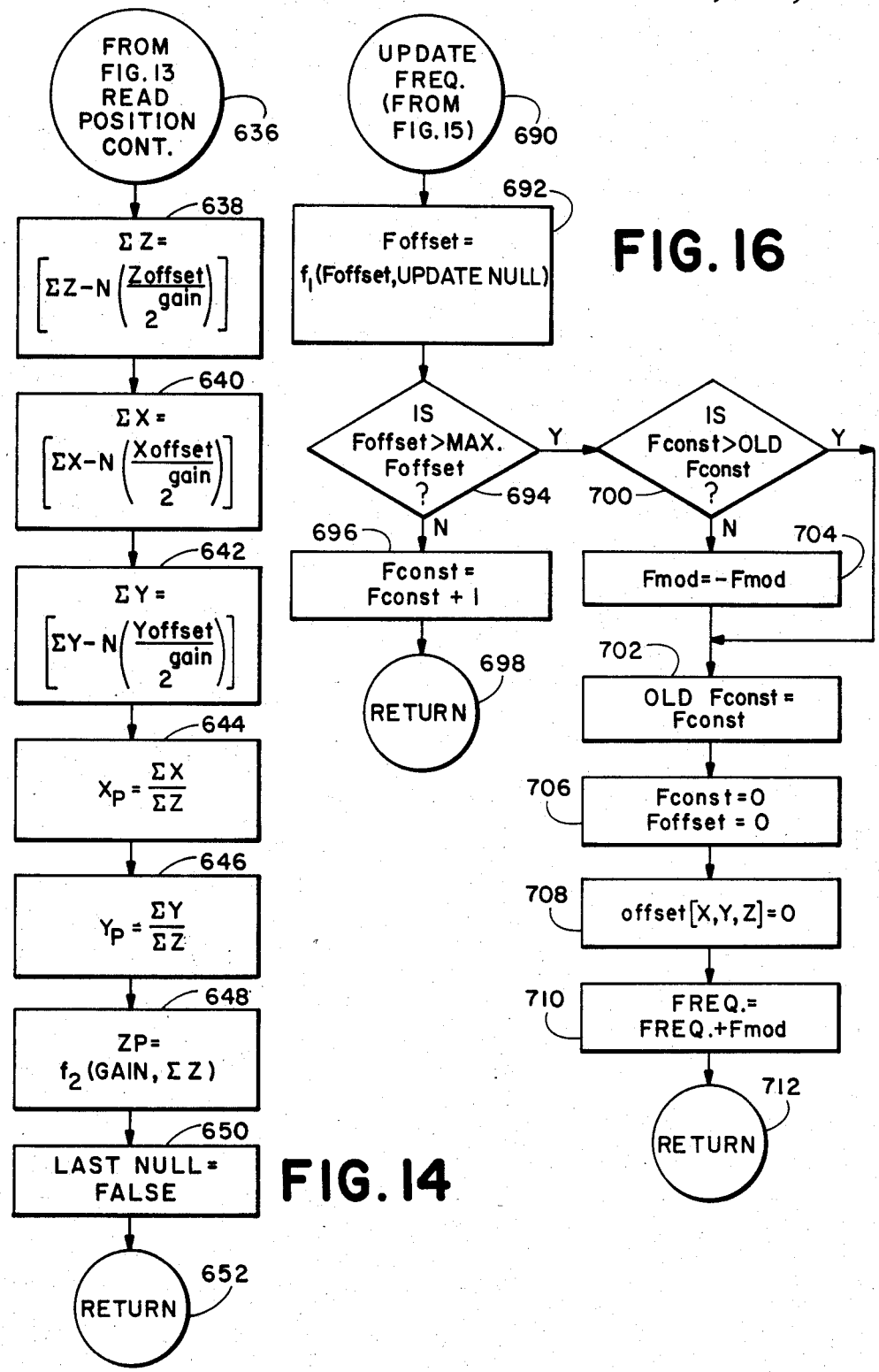

The subroutines for returning new X, Y and Z values are shown in FIGS. 13 and 14, and commence at a block 610 in FIG. 13. Typically, although not required in all situations, touch current signals are averaged and the averages are used in determining touch locations. At block 612, the number of samples which are to be averaged is established. This number is set equal to a function $f_1$ of the gain, wherein the gain corresponds to the gain setting of the integrator. More specifically, $f_1$ (gain) is equal to 2 when the gain setting is 0 or one; is equal to 4 when the gain setting is 2 or 3; is equal to 8 when the gain setting is 4 or 5; and is equal to 16 when the gain setting is either 6 or 7. The samples are selected so as to enhance noise rejection via averaging, while still maintaining a reasonable response time. Other gain functions may also be used if desired.

At block 614, accumulators for summing the digitized X, Y and Z touch current measurements are cleared to zero. Thereafter, block 616 is reached and the Z touch current is measured. Although the X or Y touch currents could be measured at this point, typically the Z touch current is measured and evaluated in order to determine whether excessive touch currents exist and also whether the gain setting should be adjusted. The measured Z touch current is then checked at block 618 to determine whether it is greater than a predetermined maximum value, max.Z. If yes, the gain setting is checked at block 620 to determine if it is zero, corresponding to the minimum inegration time. If zero, this means that excessive impedance touch current exists because the shortest integration time is being used and the impedance touch current is still greater than the maximum value. In this case, at block 621 the signal generator 30 is shut off and the multiplexer switches are opened. In addition, X and Y are set equal to their previous values and Z is set equal to zero to indicate a shut down condition. Also, the last null flag is set equal to false for use in subsequent updating of nulls. The process then returns at block 624. In FIG. 9, when block 508 is reached, shut down is indicated and the delay of block 510 is implemented.

If at block 620 (FIG. 10) a determination is made that the gain setting is not equal to zero, the gain setting is then set equal to zero at block 622. Processing then continues at block 612. When block 618 is again reached, if the yes branch is followed the gain setting is now zero and shut down occurs. However, if the impedance touch current is not greater than max.Z, block 626 is reached. At this block, a determination is made as to whether the impedance touch current is less than a minimum desired value, min.Z. If so, an adjustment of the gain is made via a subroutine 628. That is, from block 626, a block 630 is reached and a determination is made as to whether the gain is equal to the maximum gain setting. If so, block 632 is reached at which X, Y and Z are set to indicate no touch. In other words, insufficient impedance current signals have been detected over the maximum integration time period to trigger the indication of touch. From block 632, frequency and null update subroutines are reached at block 634. Following these subroutines, the processing returns as indicated at block 636. With this processing sequence, the update offset subroutines are not reached except during no touch conditions. Therefore, frequency and nulling adjustments are not made while a touch is being detected.

If at block 630 a determination is made that the gain is not at the maximum setting, block 638 is reached. At this point, the gain setting or integration time period is incremented by 1. In addition, rather than remeasuring Z at this point, Z is simply set equal to (2Z). Then, at block 640, Z is checked to see whether it is less than the min.Z. If so, processing returns to block 630 as previously described. If not, the procedure returns to block 612 and the touch panel device is operated with a different gain setting.

Assume that when block 626 is reached, a determination is made that the impedance touch current is not less than the min.Z value. This means that Z is within the desired min.Z to max.Z range and a touch is indicated. At block 628, the impedance touch current measurements are summed, and X and Y touch currents are measured and summed. At block 630, the number of samples is decremented. Following this, at block 632, a determination is made as to whether all of the samples set at block 612 have been obtained. If no, processing continues at block 616. If yes, processing proceeds via block 634 to block 636 (FIG. 14). At the following blocks 638, 640 and 642 the respective summations are adjusted to remove the effect of the X, Y and Z offsets that were initially determined at block 570 (FIG. 11) or which have been updated as set forth in the FIG. 15 subroutine. These offsets are determined with the gain setting equal to zero. However, X, Y and Z measurements are not necessarily determined with the same gain setting. Therefore, during this adjustment the offsets are divided by two to the gain power. In addition, the total offset is determined by multiplying the offset for an individual measurement by N, the total number of samples included within the summation. Thus, microcontroller 108 compensates for residual null offset currents. At blocks 644 and 646, the X and Y positions of touch $(X_p, Y_p)$ are computed. In addition, $Z_p$, the impedance value is set equal to a function, $f_2$, of the gain and the summation of Z. Specifically, $f_2$ (gain, summation of Z) equals $[(Max.gain - gain) \times 16] + [\text{summation } Z/2^6]$. This function is selected to denote the logarithm to the base 2 of the gain and for an indication of the value within the gain range. Thereafter, at block 650, a last null flag is set equal to false and processing is returned at block 652.

Figure 15:
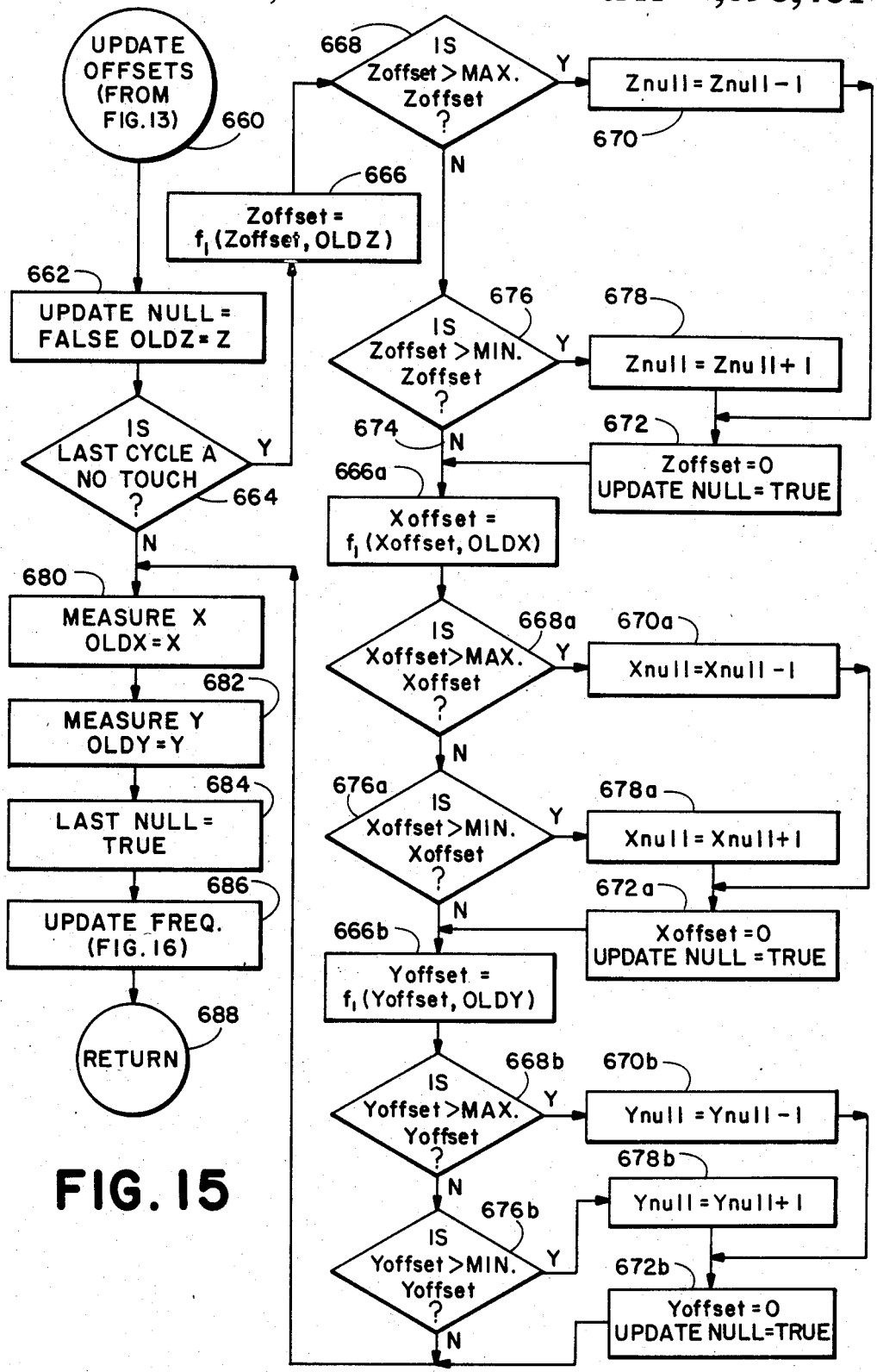
FIG. 15 is a flow chart of a sequence utilized by the microcontroller of FIG. 1 for adjusting the nulling of touch signals when the touch sensing surface is untouched.

Referring to FIG. 15, the updating of null offsets and the panel drive frequency will next be described, commencing at block 660 in FIG. 15. At block 662, an update null flag is equal to false. In addition, the OLDZ value is set equal to Z. At block 664, the question is asked as to whether the previous scanning cycle was also a no touch situation. If yes, the respective Z, X and Y offsets are then checked in succession to see if any updating of the offsets is required. In other words, a no touch situation must exist for a full cycle before any null updating takes place.

During null updating, from block 664, a block 666 is reached. At this block, the Zoffset is set equal to a function, $f_1$, of Zoffset and OLDZ. Namely, $f_1$ (Zoffset, OLDZ) = [Zoffset − Zoffset/$2^5$ + OLDZ/$2^5$]. Other functions are suitable, but this particular function is selected to perform filtering of the offset values. The Zoffset is then evaluated at block 668 to determine whether it is greater than the max.Zoffset. If yes, the automatic nulling circuit needs to be adjusted to remove capacitance from the SIG+ output. This is done by decrementing the nulling signals by one step at block 670. From block 670, a block 672 is reached at which time the Zoffset is set equal to zero and the update null flag is set true. This flag indicates that a nulling update has been performed. The subroutine then continues at location 674.

Assume that at block 668, Zoffset was determined not to be greater than max.Zoffset. In this case, block 676 is reached and a determination is made as to whether Zoffset is greater than a min.Zoffset. If so, the automatic nulling circuit has not coupled enough capacitance to the SIG+ output. Consequently, block 678 is reached. At this block the nulling signal is incremented by one step to add in additional capacitance. From block 678, the steps indicated in block 672 are performed. If both the no branches of blocks 668 and 676 have been followed to point 674, this indicates that no adjustment of the Zoffset is required.

The Xoffset is evaluated in the same manner as the Zoffset. Consequently, blocks corresponding to the previously discussed blocks are given the same number with the added letter a. Similarly, blocks in the Yoffset evaluation and adjustment portion of the subroutine are designated with like numbers, but with the added letter b. Also, it should be noted that $f_1$ (Xoffset, OLDX) = [Xoffset − Xoffset/$2^5$ + OLDX/$2^5$]. In addition, $f_1$ (Yoffset, OLDY) = [Yoffset − Yoffset/$2^5$ + OLDY/$2^5$].

Following evaluation of the null offsets and any updating as required, the processing continues at block 680. At block 680, the X touch current is measured (see FIG. 12) and OLDX is set equal to X. Then, at block 682, the Y touch current is measured and OLDY is set equal to Y. The last null flag is set equal to true at block 684. At block 686, the UPDATE FREQ. subroutine (FIG. 16) is reached as explained below. Following the UPDATE FREQ. subroutine, processing is returned at block 688.

The FIG. 16 subroutine determines whether adjustments in the panel drive frequency are needed. This subroutine starts at block 690 and goes to a block 692. At block 692, Foffset is set equal to a function, $f_1$, of Foffset and UPDATE null. This function is used to evaluate the rate at which the automatic nulling circuit adjusts the capacitive load coupled to the SIG+ output. If the rate of nulling adjustments becomes too high, this indicates that the touch panel may be driven at a frequency which is too close to fixed frequency interference spectra in the environment. In this case, the frequency is adjusted by the microcontroller 108.

In a specific example, $f_1$ (Foffset, UPDATE null) = [Foffset − Foffset/$2^3$ + (16 if update null flag equal true or zero if update null flag equal false)]. At block 694, Foffset is checked to see if it is greater than a predetermined maximum value of Foffset, namely max.Foffset. If this is not the case, then changes in nulling are not occurring at a rate which exceeds the maximum rate. Therefore, block 696 is reached. At this block, Fconst is set equal to Fconst+1 and the process is returned at block 698. Fconst is thus updated each time that a no touch condition is detected and in which Foffset is not greater than max.Foffset. In other words, Fconst represents the duration of the time during which the panel is untouched and satisfactorally nulled between drive panel frequency adjustments.

Assume at block 694 a determination is made that Foffset is greater than max.Foffset. In this case, block 700 is reached and a comparison is made between the current Fconst and the prior Fconst. That is, whether the duration of time which nulling adjustments were not made is greater at the present operating frequency than at the prior operating frequency. If so, this indicates that any previous change in frequency was in the proper direction. In this case, at block 702 OLDFconst is set equal to Fconst. In contrast, if the present drive frequency resulted in more frequent nulling than the prior drive frequency, block 704 is reached. At block 704, the flag Fmod is inverted to indicated that any previous change in frequency was in the wrong direction and that the next change should be in a direction opposite to the prior change. Block 702 is then reached. From block 702, block 706 is reached, wherein Fconst and Foffset are reset equal to zero. In addition, at block 708, the X, Y and Z offsets are reset equal to zero. Also, at block 710, the frequency is adjusted in the appropriate direction by one step. Thereafter, at block 712, the subroutine returns to FIG. 15.

The determined X and Y coordinates are utilized by the user's computer 114 (FIG. 1) in any suitable manner. For example, a touch at a particular location may call a subroutine. Also, as will be readily apparent from the above description, touch location may be continuously determined as a finger is slid across the touch sensing surface. These continuous determinations may be used in computer 114 to, for example, trace a picture on the display terminal 14. The procedures set forth in the FIGS. 9 through 16 flow charts may also be used with other scanning sequences. Finally, the invention is not limited to the above processing procedures.

TABLE I

| Element | Component |
|---|---|
| 220 | 82 kilohm resistor |
| 222, 224 | 10 kilohm resistors |
| 226 | 150 picofarad capacitor |
| 228 | 47 kilohm resistor |
| 230, 232 | 33 kilohm resistors |
| 234 | 22 kilohm resistor |
| 236 | 6.8 kilohm resistor |
| 238, 240 | 390 ohm resistors |
| 242 | 6.8 kilohm resistor |
| 244 | 22 ohm resistor |
| 246 | 1 microfarad capacitor |
| 248, 252 | 2.7 ohm resistors |
| 254 | 1 microfarad capacitor |
| 256 | 22 ohm resistor |
| 330, 332 | 1 kilohm resistors |
| 334 | 10 kilohm resistor |
| 336, 338, 340, 342 | 4.7 kilohm resistors |

TABLE I-continued

| Element | Component |
| --- | --- |
| 370 | 10 kilohm resistor |
| 372 | 150 picofarad capacitor |
| 376 | 59 kilohm resistor |
| 378 | 35.7 kilohm resistor |
| 380 | 110 kilohm resistor |
| 382 | 35.7 kilohm resistor |
| 384 | 680 picofarad capacitor |
| 386 | 1 kilohm resistor |
| 452 | 1 kilohm resistor |
| 456 | 22 kilohm resistor |

Having illustrated and described the principles of our invention with reference to several preferred embodiments, it should be apparent to those persons skilled in the art that such invention may be modified in arrangemnt and detail without departing from such principles.

We claim as our invention all such modifications which come within the true spirit and scope of the following claims:

1. A touch panel device for determining the touch location at which a touch sensing surface of the device is touched comprising:

signal generator means for producing an alternating-current voltage output, the signal generator means having a frequency control input and comprising means for producing an alternating current voltage output of a frequency which is variable and controllable in response to a frequency control signal at the frequency control input;

panel scanning signal applying means for applying panel scanning signals to the touch sensing surface, the panel scanning signal applying means having an input coupled to the signal generator output, the panel scanning signal applying means having first and second panel scanning outputs comprising respective first and second alternating-current voltage panel scanning signals which are driven by the signal generator output and which are one hundred and eighty degrees out of phase from one another;

touch signal detection means having inputs coupled to the first and second panel scanning outputs and a touch signal output, the touch signal detection means comprising means for producing touch signals at the touch current signal output corresponding to the difference between the first and second panel scanning signals;

switching means for selectively coupling the first and second panel scanning outputs to the touch sensing surface so as to selectively apply the first and second panel scanning signals to the touch sensing surface and generate touch current signals at the touch signal output upon touching the touch sensing surface; and panel output signal processing means having a first input coupled to the touch signal output for receiving the touch current signals, the panel output signal processing means comprising means for determining the touch location from the touch current signals, the panel output signal processing means including signal generator frequency control circuit means coupled to the frequency control input for automatically generating frequency control signals and applying such frequency control signals to the frequency control input, the frequency control means comprising means for automatically generating frequency control signals to shift the frequency of the signal generator means output away from fixed frequency interference spectra, such as due to cathode-ray-tube flyback signals, in the environment in which the touch panel device is used.

2. A touch panel device according to claim 1 in which null touch signals comprise the magnitude of touch current signals at times when the touch sensing surface is untouched, the panel output signal processing means including means for comparing the null touch signals to a null threshold, nulling means for adjusting the null touch signals to a magnitude which is no greater than the null threshold and for changing the null touch signals to a magnitude which is no greater than the null threshold as the touch panel device is used, means for comparing the rate of change of the null touch signals to a maximum rate of change, the panel output signal processing means comprising means for generating frequency control signals which shift the frequency of the signal generator means output when the rate of change of the null touch signals exceeds the maximum rate of change.

3. A touch panel device according to claim 2 in which the rate of change is represented by a value "FOffset" and the maximum rate of change is represented by a value "MaxFOffset", and in which FOffset is determined by the following equation:

$$\text{FOffset} = [[(\text{Prior FOffset}) - (\text{Prior FOffset}/2^3)] + [2^4 \text{ if the null touch signals were changed the previous time the panel output signal processing means determined the touch panel was untouched and otherwise O)}]];$$

and in which the panel output signal processing means generates frequency control signals which shift the frequency of the signal generator means output when FOffset is greater than MaxFOffset.

4. A touch panel device according to claim 2 in which the panel output signal processing means comprises means for generating frequency control signals to shift the frequency of the signal generator means output upwardly or downwardly in response to the rate of change of the null touch signals.

5. A touch panel device according to claim 2 in which the panel output signal processing means comprises means for determining the time $T_1$, wherein $T_1$ is the time during which the touch sensing surface is untouched and nulling is not adjusted between the shifting of the signal generator output frequency from a first frequency to a second frequency, for determining the time $T_2$, wherein $T_2$ is the time during which the touch sensing surface is untouched and nulling is not adjusted between the shifting of the signal generator output frequency from the second frequency to a third frequency, and, when the rate of change of the null touch signals exceeds the maximum rate of change, for generating frequency control signals to shift the frequency of the signal generator output from the third frequency away from the second frequency in the event $T_2$ is greater than $T_1$ and for shifting the frequency of the signal generator output from the third frequency toward the second frequency in the event $T_2$ is not greater than $T_1$.

6. A touch panel device according to claim 2 in which the panel output signal processing means comprises means for generating frequency control signals which shift the frequency signal generator means output in incremental steps, the panel output signal processing means also comprising means for determining the time $T_1$, wherein $T_1$ is the time during which the touch sensing surface is untouched and nulling is not adjusted between the shifting of the signal generator output frequency by a step from a first frequency to a second frequency, the time $T_2$, wherein $T_2$ is the time during which the touch sensing surface is untouched and nulling is not adjusted between the shifting of the signal generator output frequency by a step from the second frequency to a third frequency, and when the rate of change of the null touch signals exceeds the maximum rate of change, for generating frequency control signals to shift the frequency of the signal generator output from the third frequency to a fourth frequency which is further away from the second frequency in the event $T_2$ is greater than $T_1$ and to shift the frequency of the signal generator output from the third frequency to the second frequency in the event $T_2$ is not greater than $T_1$.

7. A touch panel device for determining the touch location at which a touch sensing surface of the device is touched comprising:

signal generator means for producing an alternating-current voltage output, the signal generator means having a frequency control input and comprising means for producing an alternating current voltage output of a frequency which is variable and controllable in response to a frequency control signal at the frequency control input;

panel scanning signal applying means for applying panel scanning signals to the touch sensing surface, the panel scanning signal applying means having an input coupled to the signal generator output, the panel scanning signal applying means having first and second panel scanning outputs comprising respective first and second alternating-current voltage panel scanning signals which are driven by the signal generator output and which are one hundred and eighty degrees out of phase from one another;

touch signal detection means having inputs coupled to the first and second panel scanning outputs and a touch signal output, the touch signal detection means comprising means for producing touch current signals at the touch signal output corresponding to the difference between the first and second panel scanning signals;

switching means for selectively coupling the first and second panel scanning outputs to the touch sensing surface so as to selectively apply the first and second panel scanning signals to the touch sensing surface and generate touch current signals at the touch signal output upon touching the touch sensing surface;

panel output signal processing means having a first input coupled to the touch signal output for receiving the touch current signals, the panel output signal processing means comprising means for determining the touch location from the touch current signals, the touch signals being at a null value when the touch sensing surface is not touched;

the panel output signal processing means including signal generator frequency control means coupled to the frequency control input for automatically generating frequency control signals and applying such frequency control signals to the frequency control input to control the frequency of the output of the signal generator means, the signal generator frequency control means generating an initial frequency control signal for setting the signal generator output means frequency to an initial frequency, the panel output signal processing means including means for establishing a null threshold and for comparing the null touch signals generated at the initial frequency to the null threshold, the signal generator frequency control means comprising means for automatically changing the initial frequency control signal to thereby change the signal generator means output frequency to a second frequency different from the initial frequency in the event the null touch signals generated at the initial frequency exceed the null threshold.

8. A touch panel device according to claim 7 in which the signal generator means comprises a voltage controlled oscillator and the signal generator frequency control means comprises means for generating frequency control voltage signals.

9. A touch panel device according to claim 8 in which the initial frequency is approximately the mid-frequency of the range of voltage controlled oscillator output frequencies.

10. A touch panel device acording to claim 7 in which the panel output signal processing means includes nulling means for nulling the null touch signals to nulled values, the panel output signal processing means including means for comparing the nulled values to the null threshold, the signal generator frequency control means comprising means for automatically changing the initial frequency control signal to thereby change the signal generator means output frequency to a second frequency different from the initial frequency in the event the nulled values exceed the null threshold.

11. A touch panel device according to claim 10 in which the panel output signal processing means comprises means for performing the following steps to establish a first touch panel signal generator means operating frequency at which the touch panel device is first operated:

(a) setting the initial frequency of the signal generator means output;
(b) nulling the null touch signals to nulled values;
(c) comparing the nulled values to the null threshold;
(d) shifting the initial frequency by a first increment to another frequency if the nulled values exceed the null threshold and otherwise going to step (h);
(e) renulling the null touch signals to new nulled values;
(f) comparing the new nulled values to the null threshold;
(g) shifting the signal generator means output frequency by a second increment to a further frequency if the new nulled values exceed the null threshold and returning to step (e), otherwise going to step (h);
(h) setting a maximum number, at least two, of null touch signals to be compared and setting a maximum null touch signal magnitude deviation;
(i) comparing the magnitudes of successive null touch signals with one another and going to step (j) if the successive null touch signals have magnitudes which differ by more than the maximum null touch signal magnitude deviation, otherwise going to step (k);

(j) shifting the signal generator means output frequency by a third increment which is less than the first and second increments and returning to step (e);

(k) determining if the maximum number of null touch signals have been compared, and if not, returning to step (i), otherwise the signal generator means output frequency is the first touch panel operating frequency.

12. A touch panel device according to claim 11 in which the first and second increments are equal.

13. A touch panel device according to claim 11 in which the panel output signal processing means comprises means for performing the following additional steps to update the first touch panel operating frequency as the touch panel device is operated:

(a) nulling the null touch signals to nulled values as the touch panel device is operated;

(b) establishing a maximum rate of nulling of the null touch signals, determining the rate at which nulling of the null touch signals to nulled values takes place, and shifting the touch panel operating frequency to a different touch panel operating frequency when the determined rate of nulling exceeds the maximum rate of nulling.

14. A touch panel device according to claim 13 in which the panel output signal processing means comprises means for determining the direction in which the operating frequency is to be shifted from the duration of time that the touch panel is untouched between touch panel operating frequency changes.

15. A touch panel device according to claim 7 in which the switching means comprises means for selectively coupling one of first and second panel scanning outputs to a first side of the touch sensing surface and the first and second panel scanning outputs to a second side of the touch sensing surface, the second side being located across the touch sensing surface in a first direction from the first side, so as to establish a voltage gradient across the touch sensing surface in the first direction from the first to the second sides and so as to provide a first touch current signal at the touch signal output when the touch sensing surface is touched, the switching means also comprises means for selectively and simultaneously coupling one of the first and second panel scanning outputs to the first and second sides of the touch sensing surface to provide an impedance touch current signal at the touch signal output when the touch sensing surface is touched, and the panel output signal processing means comprises means for determining the touch location along the first direction from the first touch current signal and the impedance touch current signal.

16. A touch panel device according to claim 7 in which the switching means comprises means for selectively coupling one of first and second panel scanning outputs to a first side of the touch sensing surface and the other of the first and second panel scanning outputs to a second side of the touch sensing surface, the second side being located across the touch sensing surface in a first direction from the first side, so as to establish a voltage gradient across the touch sensing surface in the first direction from the first to the second sides and so as to provide a first touch current signal at the touch signal output when the touch sensing surface is touched, the switching means comprising means for selectively coupling one of the first and second panel scnning outputs to a third side of the touch sensing surface and the other of the first and second panel scanning outputs to a fourth side of the touch sensing surface, the fourth side being located across the touch sensing surface in a second direction from the first side, so as to establish a voltage gradient across the touch sensing surface in the second direction from the third to the fourth sides and so as to provide a second touch current signal at the touch signal output when the touch sensing surface is touched, the switching means comprising means for selectively and simultaneously coupling one of the first and second panel scanning outputs to at least one of the first, second, third and fourth sides of the touch sensing surface to provide an impedance touch current signal at the touch signal output when the touch sensing surface is touched, the panel output signal processing means comprising means for determining the touch location along the first and second directions from the first touch current signal, the second touch current signal and the impedance touch current signal.

17. A touch panel device according to claim 16 in which the panel scanning signal applying means includes transformer means having a primary winding means connected to the signal generator output so as to be driven by the signal generator means, the transformer means also having a secondary winding means with first and second secondary winding outputs comprising the first and second panel scanning signal outputs, and a center tap comprising the touch signal output, the secondary winding means providing panel scanning signals as the primary winding means is driven by the signal generator output.

* * * * *